US008644490B2

(12) United States Patent
Stewart

(10) Patent No.: US 8,644,490 B2
(45) Date of Patent: Feb. 4, 2014

(54) SHADOW QUEUE FOR CALLERS IN A PERFORMANCE/PATTERN MATCHING BASED CALL ROUTING SYSTEM

(75) Inventor: Randall R. Stewart, Chapin, SC (US)

(73) Assignee: Satmap International Holdings Limited, Hamilton (BM)

( * ) Notice: Subject to any disclaimer, the term of this patent is extended or adjusted under 35 U.S.C. 154(b) by 1135 days.

(21) Appl. No.: 12/202,101

(22) Filed: Aug. 29, 2008

(65) Prior Publication Data

US 2010/0054453 A1 Mar. 4, 2010

(51) Int. Cl.
 *H04M 3/00* (2006.01)
 *H04M 5/00* (2006.01)

(52) U.S. Cl.
 USPC ............ 379/265.12; 379/265.02; 379/265.05; 379/265.11; 379/266.01; 379/266.02

(58) Field of Classification Search
 USPC ............. 379/265.01–265.02, 265.11–265.12, 379/266.02, 265.05, 266.01
 See application file for complete search history.

(56) References Cited

U.S. PATENT DOCUMENTS

| | | | |
|---|---|---|---|
| 5,155,763 A | 10/1992 | Bigus et al. | |
| 5,206,903 A * | 4/1993 | Kohler et al. | 379/265.12 |
| 5,702,253 A | 12/1997 | Bryce et al. | |
| 5,825,869 A | 10/1998 | Brooks et al. | |
| 5,926,538 A | 7/1999 | Deryugin et al. | |
| 6,052,460 A | 4/2000 | Fisher et al. | |
| 6,064,731 A | 5/2000 | Flockhart et al. | |
| 6,163,607 A | 12/2000 | Bogart et al. | |
| 6,222,919 B1 * | 4/2001 | Hollatz et al. | 379/265.12 |
| 6,324,282 B1 | 11/2001 | McIllwaine et al. | |
| 6,333,979 B1 | 12/2001 | Bondi et al. | |
| 6,389,132 B1 | 5/2002 | Price | |
| 6,389,400 B1 | 5/2002 | Bushey et al. | |
| 6,408,066 B1 * | 6/2002 | Andruska et al. | 379/265.12 |
| 6,411,687 B1 | 6/2002 | Bohacek et al. | |
| 6,424,709 B1 | 7/2002 | Doyle et al. | |

(Continued)

FOREIGN PATENT DOCUMENTS

| | | |
|---|---|---|
| EP | 0 493 292 A2 | 7/1992 |
| EP | 0 949 793 A1 | 10/1999 |

(Continued)

OTHER PUBLICATIONS

Anonymous. (2006). "Performance Based Routing in Profit Call Centers," *The Decision Makers' Direct*, located at www.decisioncraft.com, Issue 12/06/1, three pages.

(Continued)

*Primary Examiner* — Thjuan K Addy
(74) *Attorney, Agent, or Firm* — Foley & Lardner LLP

(57) ABSTRACT

Methods and systems are disclosed for routing callers to agents in a contact center, along with an intelligent routing system. A method for routing callers includes routing a caller, if agents are available, to an agent based on a pattern matching algorithm (which may include performance based matching, pattern matching based on agent and caller data, computer models for predicting outcomes of agent-caller pairs, and so on). Further, if no agents are available for the incoming caller, the method includes holding the caller in a shadow queue, e.g., a set of callers. When an agent becomes available the method includes scanning all of the callers in the shadow queue and matching the agent to the best matching caller within shadow queue.

26 Claims, 12 Drawing Sheets

(56) References Cited

U.S. PATENT DOCUMENTS

| | | |
|---|---|---|
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,092,509 B1 | 8/2006 | Mears et al. |
| 7,103,172 B2 | 9/2006 | Brown et al. |
| 7,209,549 B2 | 4/2007 | Reynolds et al. |
| 7,231,032 B2 | 6/2007 | Nevman et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1* | 9/2007 | Wu et al. ................. 379/265.11 |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,229,102 B2 | 7/2012 | Knott et al. |
| 8,295,471 B2 | 10/2012 | Spottiswoode et al. |
| 2002/0018554 A1 | 2/2002 | Jensen et al. |
| 2002/0046030 A1 | 4/2002 | Harista et al. |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1* | 5/2004 | Das et al. ................. 379/265.12 |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0043986 A1 | 2/2005 | McConnell et al. |
| 2005/0129212 A1 | 6/2005 | Parker |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1* | 5/2006 | Bushey et al. ............ 379/266.02 |
| 2006/0110052 A1 | 5/2006 | Finlayson |
| 2006/0124113 A1 | 6/2006 | Roberts, Sr. |
| 2006/0184040 A1 | 8/2006 | Keller et al. |
| 2006/0222164 A1 | 10/2006 | Contractor et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1* | 3/2007 | Flockhart et al. ......... 379/265.02 |
| 2007/0121829 A1 | 5/2007 | Tal et al. |
| 2007/0154007 A1 | 7/2007 | Bernhard |
| 2007/0198322 A1 | 8/2007 | Bourne et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1* | 4/2009 | Patel et al. ..................... 379/52 |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0234710 A1 | 9/2009 | Belgaied Hassine et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054452 A1 | 3/2010 | Afzal |
| 2010/0111288 A1 | 5/2010 | Afzal et al. |
| 2010/0183138 A1 | 7/2010 | Spottiswoode et al. |
| 2011/0022357 A1 | 1/2011 | Vock et al. |
| 2011/0125048 A1 | 5/2011 | Causevic et al. |
| 2012/0278136 A1 | 11/2012 | Flockhart et al. |

FOREIGN PATENT DOCUMENTS

| | | |
|---|---|---|
| EP | 1 032 188 A1 | 8/2000 |
| JP | 2000-078292 | 3/2000 |
| JP | 2000-092213 | 3/2000 |
| JP | 2000-236393 | 8/2000 |
| JP | 2001-292236 | 10/2001 |
| WO | WO-01/63894 A2 | 8/2001 |
| WO | WO-01/63894 A3 | 8/2001 |
| WO | WO-2006/124113 A2 | 11/2006 |
| WO | WO 2010/053701 | 5/2010 |
| WO | WO-2011/081514 | 7/2011 |

OTHER PUBLICATIONS

Gans, N. et al. (2003). "Telephone Call Centers: Tutorial, Review and Research Prospects," Manuscript, pp. 1-81.

Koole, G. (2004). "Performance Analysis and Optimization in Customer Contact Centers," *Proceedings of the Quantitative Evaluation of Systems, First International Conference*, Sep. 27-30, 2004, four pages.

Koole, G. et al. (Mar. 6, 2006). "An Overview of Routing and Staffing Algorithms in Multi-Skill Customer Contact Centers," Manuscript, 42 pages.

Riedmiller, M. et al. (1993). "A Direct Adaptive Method for Faster Backpropagation Learning: The RPROP Algorithm," *1993 IEEE International Conference on Neural Networks*, San Francisco, CA, Mar. 28-Apr. 1, 1993, 1:586-591.

International Search Report mailed on Mar. 13, 2009, for PCT Application No. PCT/US2008/077042, filed on Sep. 19, 2008, 6 pages.

International Search Report mailed on Jun. 3, 2009, for PCT Application No. PCT/US2009/031611, filed on Jan. 21, 2009, 8 pages.

(56) References Cited

OTHER PUBLICATIONS

International Search Report mailed on Feb. 24, 2010, for PCT Application No. PCT/US2009/066254, filed on Dec. 1, 2009, 4 pages.
International Search Report mailed on Mar. 12, 2010, for PCT Application No. PCT/US2009/054352, filed on Aug. 19, 2009, 5 pages.
Written Opinion mailed on Mar. 13, 2009, for PCT Application No. PCT/US2008/077042, filed on Sep. 19, 2008, 6 pages.
Written Opinion mailed on Jun. 3, 2009, for PCT Application No. PCT/US2009/031611, filed on Jan. 21, 2009, 8 pages.
Written Opinion mailed on Feb. 24, 2010, for PCT Application No. PCT/US2009/066254, filed on Dec. 1, 2009, 6 pages.
Written Opinion mailed on Mar. 12, 2010, for PCT Application No. PCT/US/2009/054352, filed on Aug. 19, 2009, 6 pages.
U.S. Appl. No. 13/715,765, filed Dec. 14, 2012, Zia Chishti et al.
U.S. Appl. No. 13/843,541, filed Mar. 15, 2013, Zia Chisti et al.
U.S. Appl. No. 13/843,724, filed Mar. 15, 2013, Spottiswoode et al.
U.S. Appl. No. 13/843,807, filed Mar. 15, 2013, Spottiswoode et al.
U.S. Appl. No. 13/854,825, filed Apr. 1, 2013, Zia Chisti et al.
Notice of Allowance dated Feb. 28, 2013 issued in connection with U.S. Appl. No. 12/331,201.
Office Action dated Jan. 30, 2013 issued in connection with Chinese Application No. 20098011060.8, with English translation.
Office Action dated Feb. 21, 2013 issued in connection with Japanese Patent Application No. 2010-544292.
U.S. Appl. No. 12/266,415, filed Nov. 6, 2008, Afzal et al.
U.S. Appl. No. 12/266,418, filed Nov. 6, 2008, Xie et al.
U.S. Appl. No. 12/266,446, filed Nov. 6, 2008, Chishti.
U.S. Appl. No. 12/266,461 filed Nov. 6, 2008, Chishti.
U.S. Appl. No. 12/331,153, filed Jan. 16, 2009, Xie et al.
U.S. Appl. No. 12/355,602, filed Jan. 16, 2009, Xie et al.
U.S. Appl. No. 12/355,618, filed Jan. 16, 2009, Spottiswoode et al.
U.S. Appl. No. 12/869,645, filed Aug. 26, 2010, Chishti et al.
U.S. Appl. No. 12/869,654, filed Aug. 26, 2010, Chishti et al.
U.S. Appl. No. 13/221,692, filed Aug. 30, 2011, Spottiswoode et al.
Notice of Allowance dated Jun. 29, 2012 issued in connection with U.S. Appl. No. 12/355,618.
Office Action dated Sep. 26, 2011 issued in connection with U.S. Appl. No. 12/355,618.
Office Action dated Feb. 3, 2012 issued in connection with U.S. Appl. No. 12/202,097.
Office Action dated Aug. 19, 2011 issued in connection with U.S. Appl. No. 12/202,097.
Office Action dated Feb. 3, 2012 issued in connection with U.S. Appl. No. 12/202,091.
Office Action dated Sep. 6, 2011 issued in connection with U.S. Appl. No. 12/202,091.
Office Action dated Oct. 7, 2011 issued in connection with U.S. Appl. No. 12/331,210.
Office Action dated Apr. 16, 2012 issued in connection with U.S. Appl. No. 12/331,210.
Office Action dated Apr. 18, 2012 issued in connection with U.S. Appl. No. 12/266,418.
Office Action dated Sep. 15, 2011 issued in connection with U.S. Appl. No. 12/266,418.
Office Action dated Oct. 29, 2012 issued in connection with U.S. Appl. No. 12/490,949.
Office Action dated Mar. 19, 2012 issued in connection with U.S. Appl. No. 12/490,949.
Office Action dated May 11, 2012 issued in connection with U.S. Appl. No. 12/331,195.
Office Action dated Oct. 7, 2011 issued in connection with U.S. Appl. No. 12/331,195.
Office Action dated Jan. 23, 2012 issued in connection with U.S. Appl. No. 12/331,186.
Office Action dated Aug. 19, 2011 issued in connection with U.S. Appl. No. 12/331,186.
Office Action dated Oct. 11, 2012 issued in connection with U.S. Appl. No. 12/267,459.
Office Action dated Mar. 2, 2012 issued in connection with U.S. Appl. No. 12/267,459.
Office Action dated Aug. 4, 2011 issued in connection with U.S. Appl. No. 12/267,459.
Office Action dated Mar. 30, 2012 issued in connection with U.S. Appl. No. 12/267,471.
Office Action dated Jun. 8, 2012 issued in connection with U.S. Appl. No. 12/266,446.
Office Action dated Sep. 12, 2011 issued in connection with U.S. Appl. No. 12/266,446.
Office Action dated Jun. 29, 2012 issued in connection with U.S. Appl. No. 12/331,153.
Office Action dated Sep. 26, 2011 issued in connection with U.S. Appl. No. 12/331,153.
Office Action dated Jun. 7, 2012 issued in connection with U.S. Appl. No. 12/331,181.
Office Action dated Sep. 13, 2011 issued in connection with U.S. Appl. No. 12/331,181.
Office Action dated Apr. 6, 2012 issued in connection with U.S. Appl. No. 12/021,251.
Office Action dated Sep. 19, 2011 issued in connection with U.S. Appl. No. 12/021,251.
Notice of Allowance dated Sep. 19, 2012 issued in connection with U.S. Appl. No. 12/180,382.
Office Action dated Mar. 1, 2012 issued in connection with U.S. Appl. No. 12/180,382.
Office Action dated Aug. 23, 2011 issued in connection with U.S. Appl. No. 12/180,382.
Office Action dated Jun. 18, 2012 issued in connection with U.S. Appl. No. 12/331,201.
Office Action dated May 11, 2012 issued in connection with U.S. Appl. No. 12/266,415.
Office Action dated Jan. 19, 2012 issued in connection with U.S. Appl. No. 12/266,415.
Office Action dated Jun. 7, 2012 issued in connection with U.S. Appl. No. 12/355,602.
Office Action dated Sep. 23, 2011 issued in connection with U.S. Appl. No. 12/355,602.
International Search Report mailed Jul. 6, 2010 issued in connection with PCT/US2009/061537.
Written Opinion mailed Jul. 6, 2010 issued in connection with PCT/US2009/061537.
Office Action dated Jan. 15, 2013 issued in connection with U.S. Appl. No. 12/267,471.
Office Action dated Jan. 3, 2013 issued in connection with U.S. Appl. No. 12/331,210.
Office Action dated Nov. 1, 2012 issued in connection with Chinese Application No. 20088012833.6, with English translation.
Office Action dated Nov. 1, 2012 issued in connection with Mexican Application No. MX/a/2010/008238.
Office Action dated Nov. 1, 2012 issued in connection with Mexican Application No. MX/a/2011/002272.
Office Action dated Jan. 8, 2013 issued in connection with Australian Patent Application No. 2008349500.
Office Action dated Jan. 8, 2013 issued in connection with Australian Patent Application No. 2009209317.
International Search Report dated Jun. 14, 2013 issued in connection with PCT/US2013/033261.
International Search Report dated May 31, 2013 issued in connection with International Application No. PCT/US 13/33268.
Notice of Allowance dated Apr. 11, 2013 issued in connection with U.S. Appl. No. 12/869,654.
Notice of Allowance dated Apr. 10, 2013 issued in connection with U.S. Appl. No. 12/266,461.
Ntzoufras, "Bayesian Modeling Using Winbugs". Wiley Interscience, Oct. 18, 2007.
Office Action dated Jan. 31, 2013 issued in connection with U.S. Appl. No. 12/331,161.
Office Action dated Dec. 13, 2012 issued in connection with U.S. Appl. No. 12/355,602.
Office Action dated Dec. 28, 2012 issued in connection with U.S. Appl. No. 12/266,461.
Office Action dated Dec. 31, 2012 issued in connection with U.S. Appl. No. 12/869,645.

(56) References Cited

OTHER PUBLICATIONS

Office Action dated Dec. 31, 2012 issued in connection with U.S. Appl. No. 12/869,654.
Office Action dated Mar. 28, 2013 issued in connection with U.S. Appl. No. 13/221,692.
Office Action dated Jun. 27, 2013 issued in connection with U.S. Appl. No. 12/869,645.
Office Action dated Aug. 31, 2012 issued in connection with Mexican Patent Application No. MX/a/2011/004815.
Office Action dated Jun. 7, 2013 issued in connection with Japanese Patent Application No. 2010-544399.
Office Action dated Mar. 20, 2013 issued in connection with U.S. Appl. No. 12/331,153.
Office Action dated May 21, 2013 issued in connection with U.S. Appl. No. 12/267,459.
Office Action mailed Apr. 24, 2013 issued in connection with Mexican Patent Application No. MX/a/2011/004815.
Written Opinion dated Jun. 14, 2013 issued in connection with PCT/US2013/033261.
Written Opinion dated May 31, 2013 issued in connection with International Application No. PCT/US 13/33268.
Notice of Allowance dated Sep. 18, 2013 issued in connection with U.S. Appl. No. 12/331,153.
Notice of Allowance dated Sep. 5, 2013 issued in connection with U.S. Appl. No. 12/331,161.
Office Action dated Oct. 21, 2013 issued in connection with U.S. Appl. No. 12/331,210.
Office Action dated Aug. 13, 2013 issued in connection with U.S. Appl. No. 13/854,825.
Office Action dated Sep. 23, 2013 issued in connection with U.S. Appl. No. 12/331,186.
Office Action dated Sep. 24, 2013 issued in connection with U.S. Appl. No. 12/202,097.
Office Action dated Jul. 30, 2013 issued in connection with U.S. Appl. No. 12/331,181.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Third Office Action dated Aug. 29, 2013 issued in connection with Chinese Application No. 2008801283369.

\* cited by examiner

SHADOW QUEUE FOR CALLERS IN A PERFORMANCE/PATTERN MATCHING BASED CALL ROUTING SYSTEM

CROSS REFERENCE TO RELATED APPLICATION

This application is related to U.S. Ser. No. 12/021,251, entitled "Systems and Methods for Routing Callers to an Agent in a Contact Center," and filed Jan. 28, 2008, which is hereby incorporated by reference in its entirety.

BACKGROUND

The present invention relates to the field of routing phone calls and other telecommunications in a contact center system.

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals acquired by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion. Other attempts have been made to alter the general round-robin system. For example, U.S. Pat. No. 7,231,032 describes a telephone system wherein the agents themselves each create personal routing rules for incoming callers, allowing each agent to customize the types of callers that are routed to them. These rules can include a list of particular callers the agent wants routed to them, such as callers that the agent has interacted with before. This system, however, is skewed towards the agent's preference and does not take into account the relative capabilities of the agents nor the individual characteristics of the callers and the agents themselves.

BRIEF SUMMARY

Systems and methods are described for matching and routing callers to agents in a contact center environment that includes pattern matching based on caller data and agent data. An exemplary method includes determining a desired skill set (e.g., language preference) for an incoming caller to the call center, and determining the number of agents that are available for the desired skill set (assuming there are multiple skill sets for a particular call center). If multiple agents are available for the determined skill set the method may include routing the caller to the best matching agent of the available agents. For example, a performance based routing method and system that relies on pattern matching algorithms or computer models may route the caller to the highest performing agent, or may compare caller data associated with the caller with agent data associated with each of the multiple agents and route the call according to the best match.

If no agents are available for the determined skill set, the method may include holding the caller with a set of callers (referred to herein as a "shadow queue" or "shadow skill set queue") and when an agent becomes available matching the agent to the best matching caller within the set of callers. For instance, the callers may be pulled out of sequence in order to best match the newly available agent with a caller in the set of callers. The matching of the agent to the caller may be made in a similar fashion using a pattern matching algorithm or computer model.

In one example, if the caller is held for too long in the set of callers (the shadow skill set queue) waiting for an available agent the caller may be moved to a standard skill set queue for the particular skill set and routed to the next available agent. Thus, two queues may be used when no agents are available, a shadow skill set queue and a standard skill set queue. A caller may be initially placed in the shadow skill set queue for routing as described, but moved to the standard skill set queue after a predetermined time has elapsed (e.g., if the caller hold time exceeds a predetermined Service Level Agreement SLA). Callers in the standard skill set queue may be routed in a conventional manner, followed by the callers from shadow skill set queue as described.

In some examples, the amount of waiting time may be included as a factor, e.g., as a weighting factor used with other data in the pattern matching algorithm. In other examples, each caller may be assigned a threshold waiting time, which if exceeded, overrides the pattern matching algorithm. Further, each caller may be individually assigned waiting time thresholds, e.g., based on data associated with the caller, such as their inclination to generate revenue or preferred account status, or all callers may be given a common waiting time threshold.

In another example, a system or apparatus for routing callers to agents in a call routing center environment is described. The apparatus may include logic for determining if agents are available for a caller and logic for causing the caller to be routed if agents are available to the best matching agent of available agents according to a pattern matching algorithm. The apparatus may further include logic for holding the caller in a set of callers if no agents are available and when an agent becomes available matching the agent to the best matching caller within the set of callers according to a pattern matching algorithm. The apparatus may include a pattern matching engine for comparing agent data and caller data to determine a best match based on adaptive pattern matching algorithms.

Various performance based and/or pattern matching algorithms for matching callers and agents based on available information regarding each may be utilized. In general, contact center routings are potentially improved or optimized by routing contacts such that callers are matched with and connected to particular agents in a manner that increases the chance of an interaction that is deemed beneficial to a contact center (referred to in this application as an "optimal interaction"). Examples of optimal interactions include increasing sales, decreasing the duration of the contact (and hence the cost to the contact center), providing for an acceptable level of customer satisfaction, or any other interaction that a contact center may seek to control or improve. The systems and methods of the present invention can improve the chance of an optimal interaction by, in general, grading agents on an optimal interaction, and matching a graded agent with a caller to increase the chance of the optimal interaction. Once matched, the caller can be connected to the graded agent. In a more advanced embodiment, the systems and methods of the present invention can also be used to increase the chance of an optimal interaction by matching a caller to an agent using a computer model derived from data describing demographic, geographic, psychographic, past purchase behavior, personality characteristics (e.g., via a Myers-Brigg Type Indicator test or the like), time effects (e.g., data associated with different times of the day, week, month, etc.) or other relevant information about a caller, together with data describing demographic, geographic, psychographic, personality characteristics, time effects, or historical performance about an agent.

In a relatively basic example, the performance of a contact center's agents is collated over a period time to grade each agent on their ability to achieve an optimal interaction. The period of time can be as short as the immediately prior contact to a period extending as long as the agent's first interaction with a caller. The grade determined for the each agent is then used as a factor in matching and connecting a caller to a particular agent. For example, certain agents may be shown to have a greater ability to generate sales than that of other agents engaged in the same contact center. Such examples, by preferentially routing callers to those agents shown to have greater ability to generate sales, can increase the chances of achieving greater sales during the contacts. Similarly, other agents may be shown to generate shorter interactions with callers than that of other agents at the same contact center. By preferentially routing contacts to the agents shown to generate shorter interactions with callers, a contact center or contact center client can decrease its overall need for agents and communication bandwidth, and therefore, reduce its costs.

In general, by grading the agents at a contact center on their ability to achieve an optimal interaction, the contact center can match and connect callers to agents to increase the chance of achieving any optimal interaction that may be chosen. The method of grading agent can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods exist.

If agents are graded on more than one optimal interaction, exemplary methods and systems can be configured to weight optimal interactions to ascertain which callers should be routed to which agent. For example, if there were two currently available agents for an individual caller, and the system estimated that routing the caller to one agent would result in a higher likelihood of a sale occurring, while routing the caller to the other agent would result in a shorter duration contact, depending on which optimal interaction the system was weighting more heavily, the caller may be routed to either the first or the second agent. In another example, if the system estimated that routing the caller to one agent would result in a high likelihood of a sale, a short contact duration, but a low level of customer satisfaction, while routing the caller to another agent would result in a high likelihood of a sale, a longer contact duration, but a higher level of customer satisfaction, depending on which mix of optimal interactions the system was weighting more heavily, the caller may be routed to the first or second agent.

The weightings placed on the various optimal interactions can take place in real-time in a manner controlled by the contact center, its clients, or in line with pre-determined rules. Optionally, the contact center or its clients may control the weighting over the internet or some another data transfer system. As an example, a client of the contact center could access the weightings currently in use over an internet browser and modify these remotely. Such a modification may be set to take immediate effect and, immediately after such a modification, subsequent caller routings occur in line with the newly establishing weightings. An instance of such an example may arise in a case where a contact center client decides that the most important strategic priority in their business at present is the maximization of revenues. In such a case, the client would remotely set the weightings to favor the selection of agents that would generate the greatest probability of a sale in a given contact. Subsequently the client may take the view that maximization of customer satisfaction is more important for their business. In this event, they can remotely set the weightings of the system such that callers are routed to agents most likely to maximize their level of satisfaction. Alternatively the change in weighting may be set to take effect at a subsequent time, for instance, commencing the following morning.

With graded agent data and a chosen optimal interaction, the system can be used to match a graded agent with a caller to increase the chance of an optimal interaction or a weighted mix of optimal interactions. The matching can occur between a caller and all agents logged in at the contact center, all agents currently available for a contact at the contact center, or any mix or subgroup thereof. The matching rules can be set such that agents with a minimum grade are the only ones suitable for matching with a caller. The matching rules can also be set such that an available agent with the highest grade for an optimal interaction or mix thereof is matched with the caller. To provide for the case in which an agent may have become unavailable in the time elapsed from the time a contact was initiated to the time the switch was directed to connect the caller to a specific agent, instead of directing the switch to connect the caller to a single agent, the matching rules can define an ordering of agent suitability for a particular caller and match the caller to the highest-graded agent in that ordering.

In another example, exemplary systems and methods can be used to increase the chances of an optimal interaction by combining agent grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences.

Caller demographic and psychographic data can be retrieved from available databases by using the caller's contact information as an index. Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

Once agent data and caller data have been collected, this data is passed to a computational system. The computational system then, in turn, uses this data in a pattern matching algorithm to create a computer model that matches each agent with each caller and estimates the probable outcome of each matching along a number of optimal interactions, such as the generation of a sale, the duration of contact, or the likelihood of generating an interaction that a customer finds satisfying. As an example, the systems and methods may indicate that, by matching a caller to a female agent, the matching will increase the probability of a sale by 4 percent, reduce the duration of a contact by 6 percent, and increase the satisfaction of the caller with the interaction by 12 percent. Generally, the systems and methods will generate more complex predictions spanning multiple demographic and psychographic aspects of agents and callers. Exemplary systems and methods might conclude, for instance, that a caller if connected to a single, white, male, 25 year old, agent that has high speed internet in his home and enjoys comedic films will result in a 12 percent increase in the probability of a sale, a 7 percent increase in the duration of the contact, and a 2 percent decrease in the caller's satisfaction with the contact. In parallel, the exemplary systems and methods may also determine that the caller if connected to a married, black, female, 55 year old agent will result in a 4 percent increase in the probability of a sale, a 6 percent decrease in the duration of a contact, and a 9 percent increase in the caller's satisfaction with the contact.

Though this advanced embodiment preferably uses agent grades, demographic, psychographic, and other business-relevant data, along with caller demographic, psychographic, and other business-relevant data, other embodiments can eliminate one or more types or categories of caller or agent data to minimize the computing power or storage necessary to employ the exemplary methods and systems.

The pattern matching algorithm to be used in the exemplary methods and systems can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm can be used to create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, the exemplary methods and systems can match every available agent with every available caller, or even a narrower subset of agents or callers. Likewise, the methods and systems can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the exemplary methods and systems to determine which agents should be connected to which callers.

For example, it may be that the computer model indicates that a caller match with agent one will result in a high chance of a sale with but a high chance of a long contact, while a caller match with agent two will result in a low chance of a sale but a high chance of a short contact. If an optimal interaction for a sale is more heavily weighted than an optimal interaction of low cost, then the suitability scores for agent one as compared to agent two will indicate that the caller should be connected to agent one. If, on the other hand, an optimal interaction for a sale is less weighted than an optimal interaction for a low cost contact, the suitability score for agent two as compared to agent one will indicate that the caller should be connected to agent two.

Another aspect of the exemplary methods and system is that it may develop affinity databases by storing data, the databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent. The caller affinity data can then be used to refine the matches that can be made using the exemplary methods and systems.

Another aspect of the exemplary methods and systems is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in the exemplary methods and systems predicting that a specific agent performs best in interactions with callers of a similar age, and less well in interactions with a caller of a significantly older or younger age. Similarly this type of affinity database may result in the exemplary methods and systems predicting that an agent with certain agent affinity data handles callers originating from a particular geography much better than the agent handles callers from other geographies. As another example, exemplary methods and systems may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches.

Exemplary methods and systems can also comprise connection rules to define when or how to connect agents that are matched to a caller. The connection rules can be as simple as instructing the method or system to connect a caller according to the best match among all available agents with that particular caller. In this manner, caller hold time can be minimized. The connection rules can also be more involved, such as instructing the method or system to connect a caller only when a minimum threshold match exists between an available agent and a caller, or to allow a defined period of time to search for a minimum matching or the best available matching at that time. The connection rules can also purposefully keep certain agents available while a search takes place for a potentially better match.

Embodiments of the present invention can include a visual computer interface and printable reports provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the weighting on an optimal interaction can also be provided to the contact center or the contact center client, such that they can, as discussed herein, monitor or change the weightings in real time or at a predetermined time in the future.

Embodiments of the present invention can be used to create an intelligent routing system, the system comprising means for grading two or more agents on an optimal interaction, and means for matching a caller with at least one of the two or more graded agents to increase the chance of the optimal interaction. Means for grading an agent can comprise, as discussed herein, the use of manual or automatic surveys, the use of a computational device and database to record an agent's revenue generation performance per call, the agent's contact time per caller, or any other performance criteria that can be electronically recorded. Means for matching the caller with at least one of the two or more graded agents can comprise any computational device. The intelligent routing system can further comprise means for connecting the caller with one of the two or more agents, such as a switching system. The system can further comprise a dialer, a callerID device, and other commercially-available telephony or telecommunications equipment, as well as memory containing a database, such as a commercially available database, publicly-available database, client database, or contact center database.

In a more advanced embodiment, the present invention can be used to create an intelligent routing system, the system comprising means for determining at least one agent data for each of two or more agents, determining at least one caller data for a caller, means for using the agent data and the caller data in a pattern matching algorithm, and means for matching the caller to one of the two or more agents to increase the chance of an optimal interaction. Means for determining agent data can comprise the use of manual or automatic surveys, which can be recorded in hardcopy or electronic form, such as through the use of computer memory containing databases for storing such information. Means for determining caller data can comprise the use of computer memory containing a database with caller data, such as a commercially-available database, client database, or contact center database. Means for determining caller data can also comprise the use of a CallerID device as well as telephony or other telecommunications equipment for receiving a caller's account number or other caller-identifying information. Means for using the agent data and the caller data in a pattern matching algorithm can comprise a computational device. Means for matching the caller to one of the two or more agents can also comprise the use of a computational device. This embodiment of the intelligent routing system can also comprise means for connecting the caller with one of the two or more agents, such as a switching or routing system. The system can also comprise means for contacting a caller, such as a dialer or telephony equipment that can be used by an agent to contact the caller.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative Figures, those of ordinary skill in the art will recognize that the invention is not limited to the examples or Figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

The description is broken into three main sections. An exemplary contact center environment is initially described followed by exemplary performance based and pattern matching routing methods and systems utilizing a shadow queue as described herein. Finally, various exemplary performance based and pattern matching routing methods and systems for use with the exemplary routing methods and systems are described.

Exemplary Contact Center Environment

Figure 1:
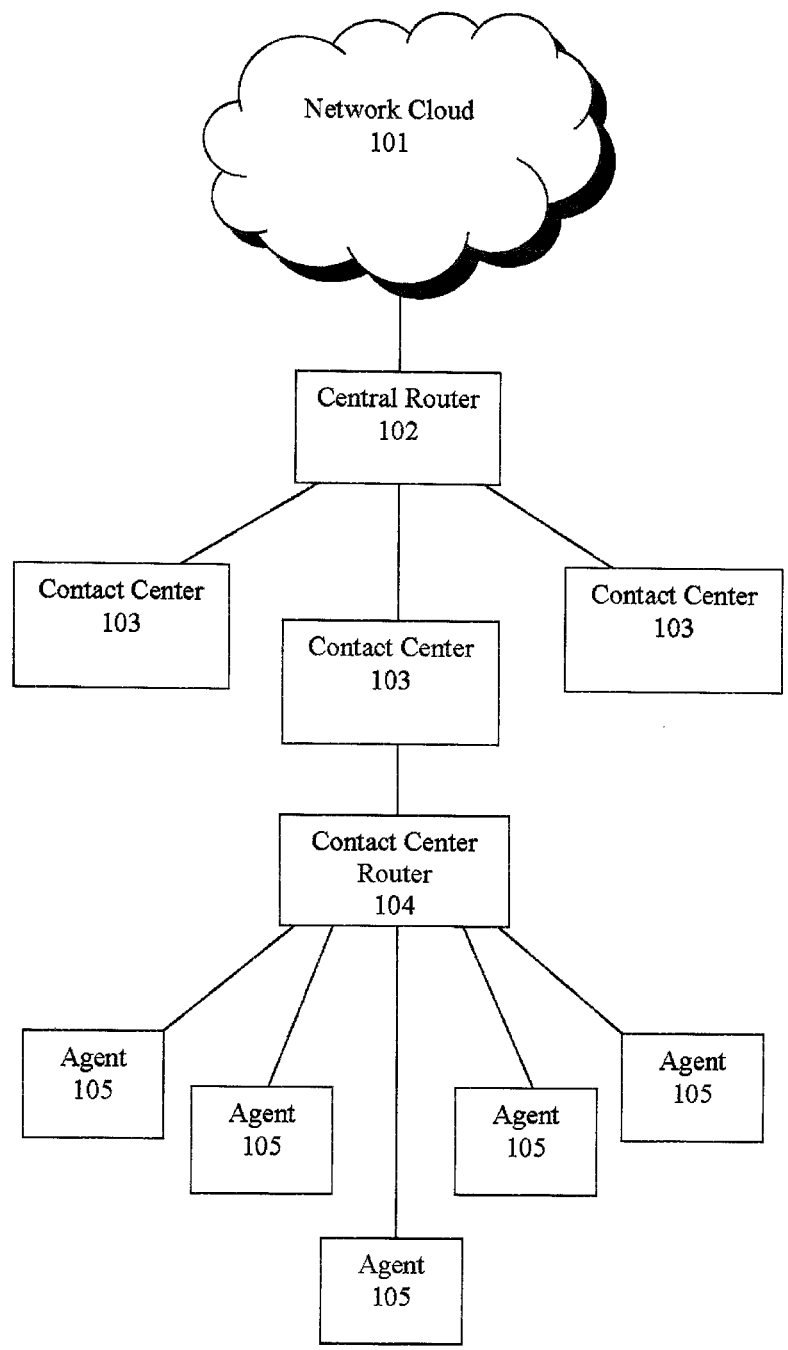
FIG. 1 is a diagram reflecting the general setup of a contact center operation.

FIG. 1 is a diagram reflecting an exemplary setup of a contact center environment. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103, though there are certainly embodiments where only one agent 105 is at the contact center 103, in which case a contact center router 104 may prove to be unnecessary.

Exemplary Routing Methods and Systems

Figure 2:
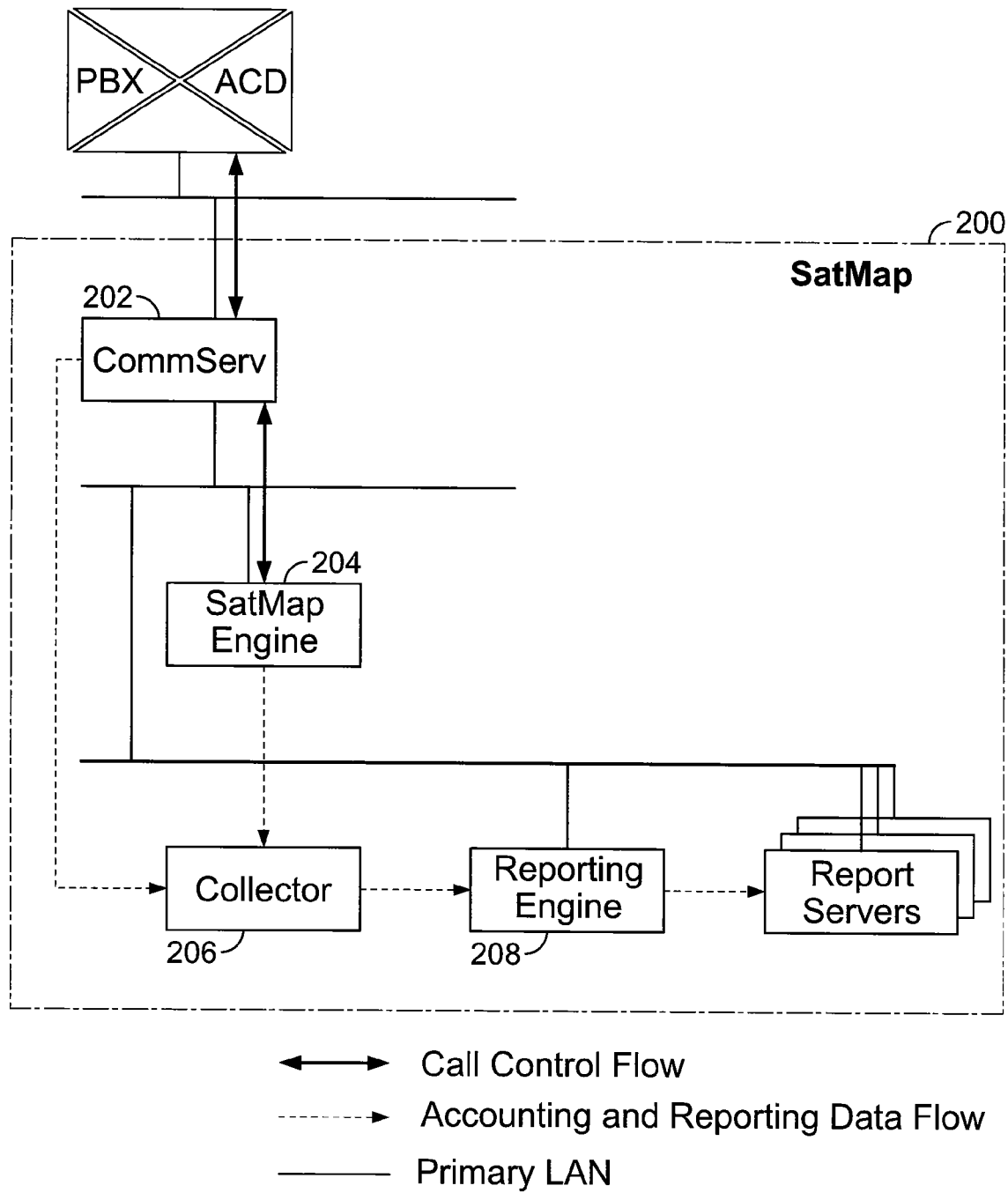
FIG. 2 illustrates an exemplary performance based contact center routing system including a pattern matching algorithm.

FIG. 2 illustrates an exemplary contact center routing system 200 (which may be included with contact center router 104 of FIG. 1). Broadly speaking, routing system 200 is operable to match callers and agents based, at least in part, on agent performance, pattern matching algorithms or computer models based on caller and/or agent data, and the like. Routing system 200 may include a communication server 202 and a pattern matching engine 204 (referred to at times as "Satisfaction Mapping" or "SatMap"). The pattern matching engine 204 may operate in various manners to match callers to agents based on pattern matching algorithms and computer models, which adapt over time based on the performance or outcomes of previous caller-agent matches. In one example, the pattern matching engine 204 includes a neural network based adaptive pattern matching engine.

Various other exemplary pattern matching and computer model systems and methods which may be included with content routing system and/or pattern matching engine 204 are described in U.S. Ser. No. 12/021,251, entitled "Systems and Methods for Routing Callers to an Agent in a Contact Center," and filed Jan. 28, 2008, which is hereby incorporated by reference in its entirety. Further, various illustrative pattern matching algorithms and computer model generation techniques are described following this section of the description.

Routing system 204 may further include other components such as collector 206 for collecting caller data of incoming callers, data regarding caller-agent pairs, outcomes of caller-agent pairs, agent data of agents, and the like. Further, routing system 200 may include a reporting engine 208 for generating reports of performance and operation of the routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
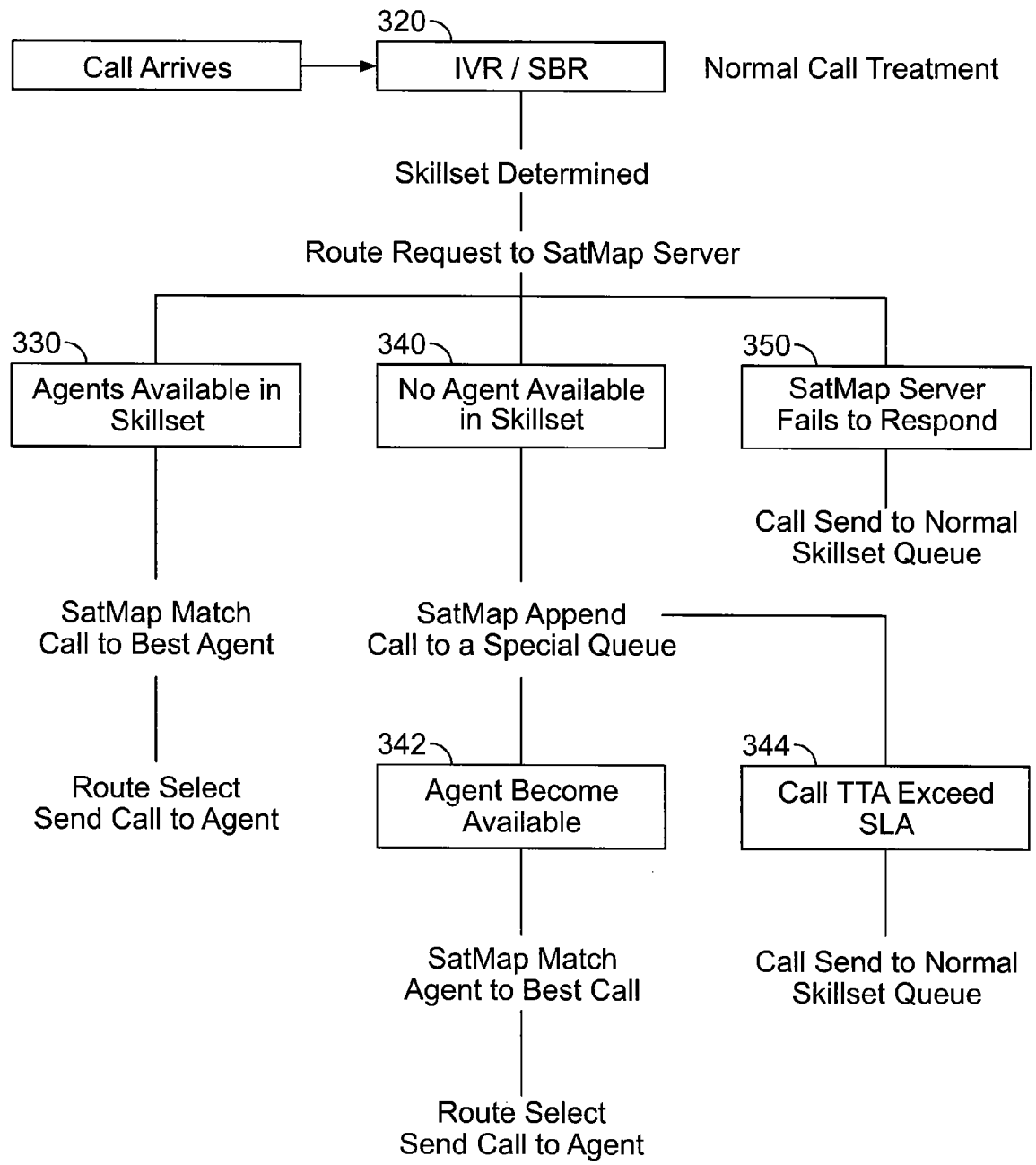
FIG. 3 illustrates an exemplary architecture and flow of an incoming call into a routing center including a routing system according to one example provided herein.

FIG. 3 illustrates an exemplary architecture and flow of an incoming call into a routing center including a routing system according to one example provided herein. An incoming call is initially given conventional treatment at 320, e.g., an interactive voice response (IVR) may determine a skill set needed or desired to service the caller. For example, the skill set may include the language spoken by the caller. In other examples, the skill set may be determined by the number that was dialed by the caller, e.g., where separate numbers are used for different languages. It will be appreciated that in some examples determining a skill set may be omitted, for example, where the call center operates in a single language or only services a single skill set.

A route request is communicated to the pattern matching engine (e.g., to pattern matching engine 204 via communication server 202 of FIG. 2). If agents are available in the skill set the pattern matching engine matches and routes the caller to the best performing agent or the best matching agent for the particular caller at 330. For example, in contrast to conventional routing systems that may use an agent queue that operates to connect the agent that has been available for the longest period of time, the pattern matching engine compares the caller to all available agents and routes the caller to the agent having the best performance or is the best match to the caller (e.g., pairing the caller to the agent having the greatest likelihood of achieving a desired output performance). The status of the agents and whether they are available may be stored and tracked in the communication server 202 or pattern matching engine 204.

If there are no agents available for the particular skill set determined for the caller at 320 then the pattern matching engine may append the call to a shadow skill set queue until an appropriate skilled agent becomes available and can be matched and routed to an agent at 342. In one example, as an agent becomes available, the pattern matching engine operates to compare all of the callers in the shadow skill queue to the agent to determine which of the callers will be routed to the agent. As such, callers may be pulled from the shadow skill out of order (i.e., the longest waiting caller is not necessarily matched to the available agent).

In some examples, however, if a caller in the shadow skill set queue exceeds a threshold waiting time that caller is moved to a standard skill set queue at 344, where the standard skill set queue is ordered and served as a conventional manner. The system may operate to route callers from the standard skill set queue first until all callers have been serviced and then route callers from the shadow skill set queue as described above.

Finally, if the pattern matching engine does not respond, e.g., the engine is down or selectively not routing certain callers) the caller may be routed to the standard skill set queue at 350. For instance, the caller can be routed based on the skill set and not based on performance or pattern matching of the pattern matching engine.

Figure 4:
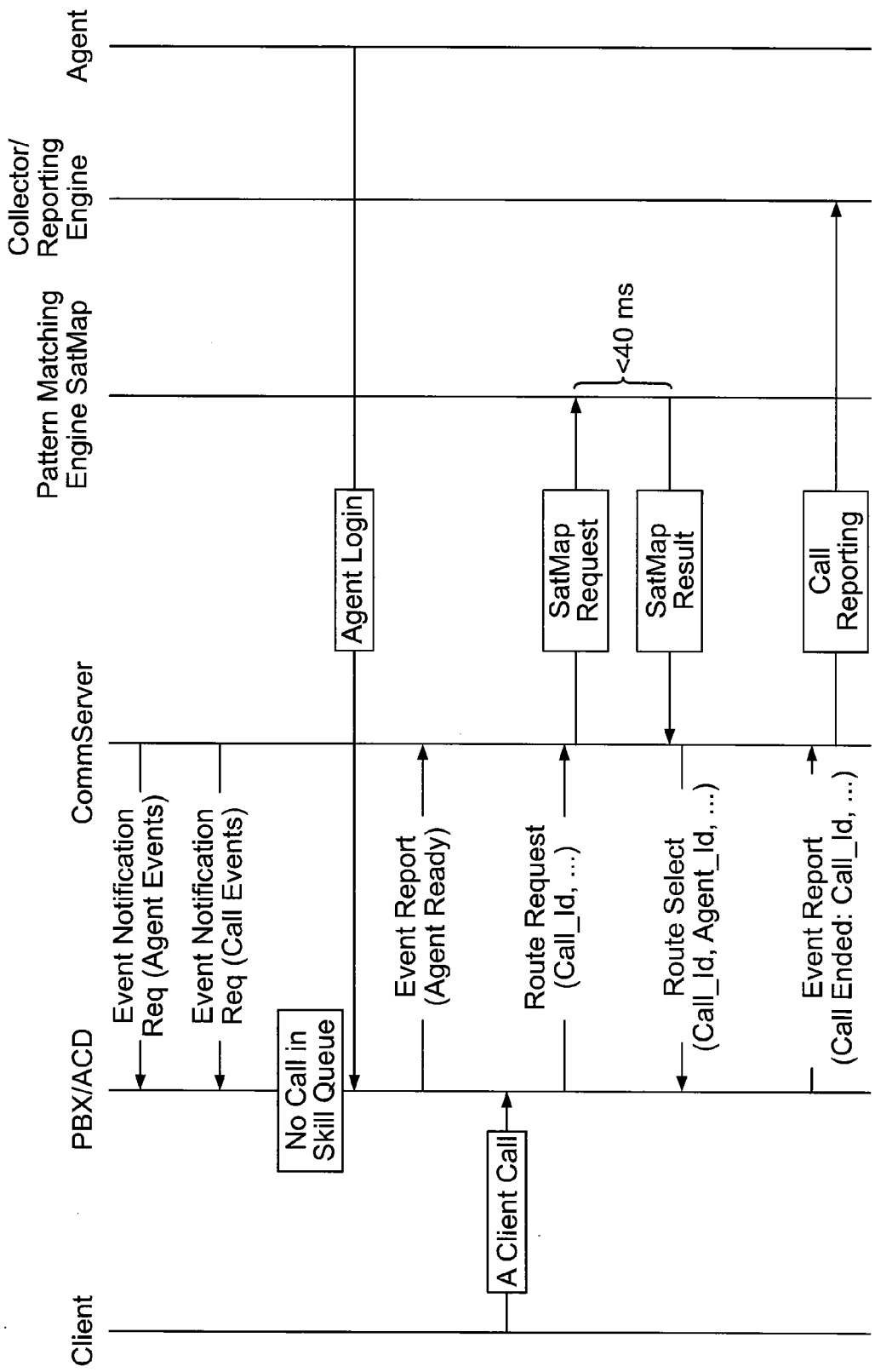
FIG. 4 illustrates an exemplary timing flow within an exemplary system including a pattern matching engine when agents are available.

FIG. 4 illustrates an exemplary timing flow diagram within an exemplary routing system including a pattern matching engine when agents are available. Initially, a communication server associated with the routing system may communicate various information to the Private Branch eXchange (PBX)/Automatic Call Distribution (ACD) server, including various agent and call related events. For example, as an agent logs into the system the information is communicated to the PBX/ACD server and an event report is communicated back to the communication server.

In response to a caller calling the PBX/ACD server, a route request is communicated to the communication server, which in turn communicates a request to the pattern matching engine. Additionally, caller data is communicated to the pattern matching engine for determining the best match of the caller based on performance or a pattern matching algorithm as described herein. The result of the routing engine (e.g., which agent to route the caller to) is communicated back to the communication server and to the PBX/ACD server as a route selection for the caller.

Finally, at the conclusion of the call, a report is communicated to the collector/reporting engine. The call report may include various information regarding the call, including the known caller data, agent data, call duration, call outcome, customer satisfaction data, agent satisfaction data, date and time of call, and so on.

Figure 5:
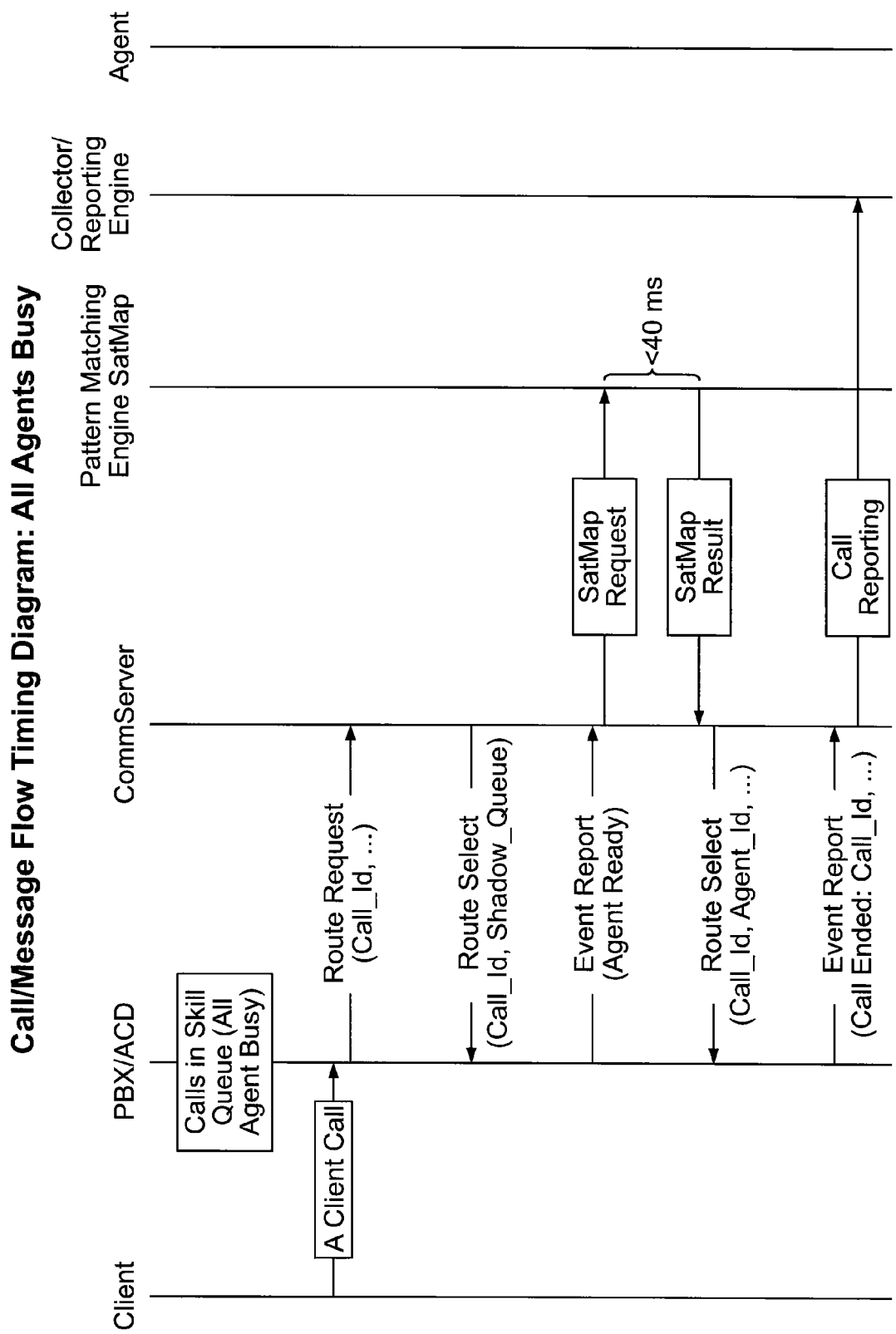
FIG. 5 illustrates an exemplary timing flow within an exemplary system including a pattern matching engine when agents are not available.

FIG. 5 illustrates an exemplary timing flow diagram within an exemplary system including a pattern matching engine when agents are not available. As illustrated, as a client calls in when all agents are busy the callers are placed in the shadow queue, which is communicated to the PBX/ACD server. When an agent becomes available, the pattern matching engine scans the callers in the shadow queue and determines a best match caller for the agent and issues a route selection accordingly. Note, in some examples, if a caller has timed out and been placed in the standard queue, that caller may be routed before callers in the shadow queue.

Exemplary Performance and Pattern Recognition Methods and Systems

The following are various exemplary methods in which the pattern matching engine may operate. For example, as described, the pattern matching algorithm may rate agents on performance, compare agent data and caller data and match per a pattern matching algorithm create computer models to predict outcomes of agent-caller pairs, and the like. It will be appreciated that a content router system may include software, hardware, firmware, or combinations thereof to implement the exemplary methods.

Figure 6:
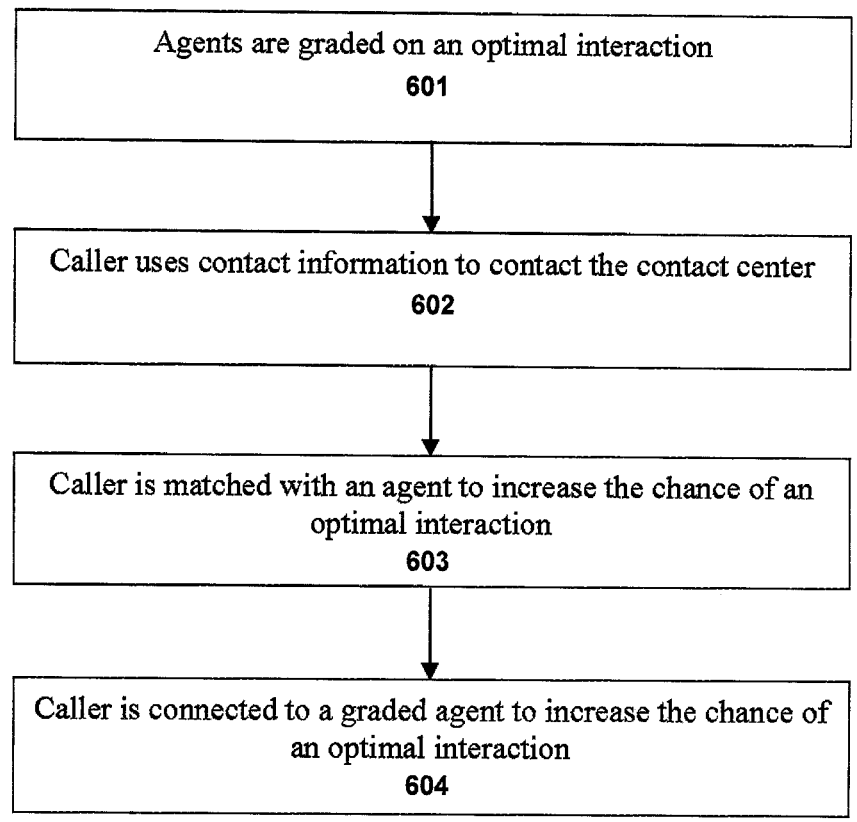
FIG. 6 is a flowchart reflecting an exemplary method for operating a contact center.

FIG. 6 is a flowchart of one exemplary method for grading agent performance. The method includes grading two agents on an optimal interaction and matching a caller with at least one of the two graded agents to increase the chance of the optimal interaction. Initially, at 601, agents are graded on an optimal interaction, such as increasing revenue, decreasing costs, or increasing customer satisfaction. Grading is accomplished by collating the performance of a contact center agent over a period of time on their ability to achieve an optimal interaction, such as a period of at least 10 days. However, the period of time can be as short as the immediately prior contact to a period extending as long as the agent's first interaction with a caller. Moreover, the method of grading agent can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods exist.

At 602 a caller uses contact information, such as a telephone number or email address, to initiate a contact with the contact center. At 603, the caller is matched with an agent or group of agents such that the chance of an optimal interaction is increased, as opposed to just using the round robin matching methods of the prior art. The matching can occur between a caller and all agents logged in at the contact center, all agents currently available for a contact at the contact center, or any mix or subgroup thereof. The matching rules can be set such that agents with a minimum grade are the only ones suitable for matching with a caller. The matching rules can also be set such that an available agent with the highest grade for an optimal interaction or mix thereof is matched with the caller. To provide for the case in which an agent may have become unavailable in the time elapsed from the time a contact was initiated to the time the switch was directed to connect the caller to a specific agent, instead of directing the switch to connect the caller to a single agent, the matching rules can define an ordering of agent suitability for a particular caller and match the caller to the highest-graded agent in that ordering. At 604, the caller is then connected to a graded agent to increase the chance of an optimal interaction, and the contact interaction between the agent and the caller then occurs.

Figure 7:
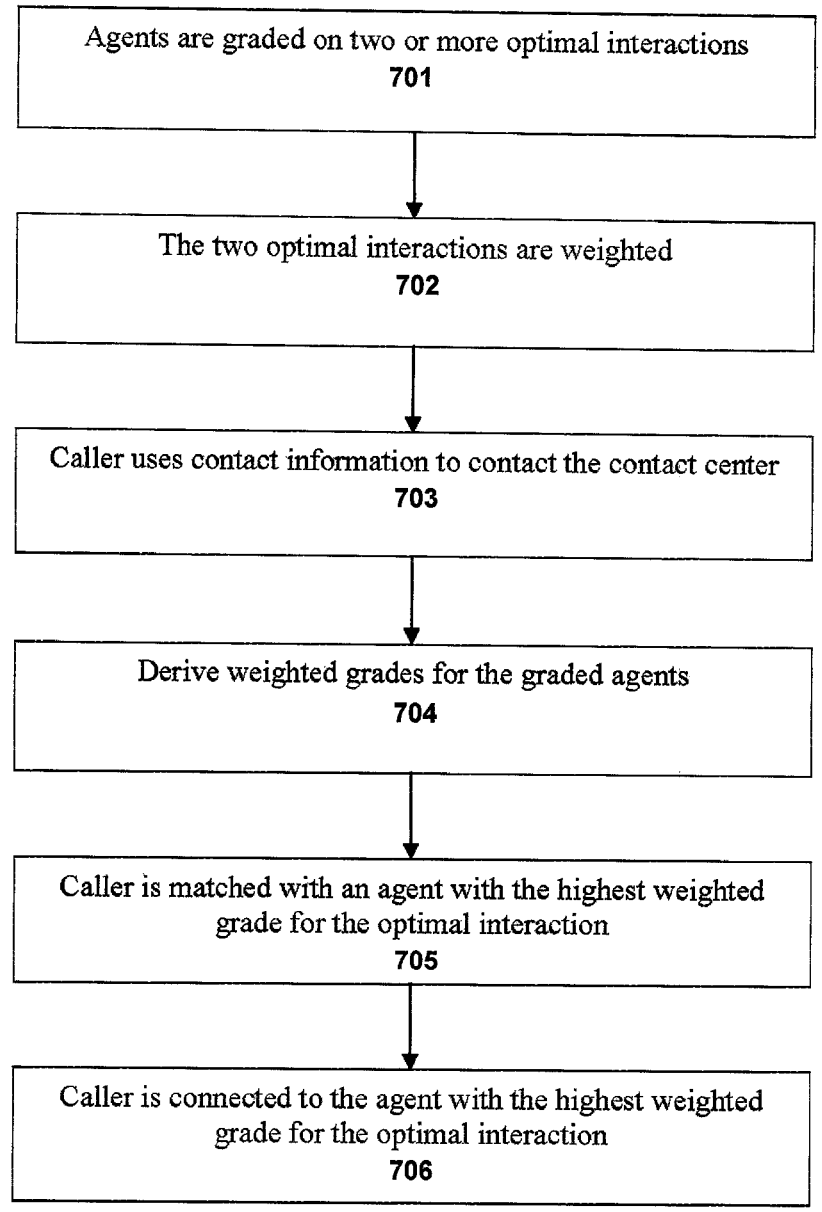
FIG. 7 is a flowchart reflecting an exemplary method for operating a contact center with weighted optimal interactions.

FIG. 7 illustrates an exemplary method for grading a group of at least two agents on two optimal interactions, weighting one optimal interaction against another optional interaction, and connecting the caller with one of the two graded agents to increase the chance of a more heavily-weighted optimal interaction. At 701, agents are graded on two or more optimal interactions, such as increasing revenue, decreasing costs, or increasing customer satisfaction. At 702, the optimal interactions are weighted against each other. The weighting can be as simple as assigning to each optimal interaction a percentage weight factor, with all such factors totaling to 100 percent. Any comparative weighting method can be used, however. The weightings placed on the various optimal interactions can take place in real-time in a manner controlled by the contact center, its clients, or in line with pre-determined rules. Optionally, the contact center or its clients may control the weighting over the internet or some another data transfer system. As an example, a client of the contact center could access the weightings currently in use over an internet browser and modify these remotely. Such a modification may be set to take immediate effect and, immediately after such a modification, subsequent caller routings occur in line with the newly establishing weightings. An instance of such an example may arise in a case where a contact center client decides that the most important strategic priority in their business at present is the maximization of revenues. In such a case, the client would remotely set the weightings to favor the selection of agents that would generate the greatest probability of a sale in a given contact. Subsequently the client may take the view that maximization of customer satisfaction is more important for their business. In this event, they can remotely set the weightings such that callers are routed to agents most likely to maximize their level of satisfaction. Alternatively the change in weighting may be set to take effect at a subsequent time, for instance, commencing the following morning.

At 703, a caller uses contact information, such as a telephone number or email address, to initiate a contact with the contact center. At 704, the optimal interaction grades for the graded agents are used with the weights placed on those optimal interactions to derive weighted grades for those graded agents. At 705, the caller is matched with an available agent with the highest weighted grade for the optimal interaction. At 706, the caller is then connected to the agent with the highest weighted grade to increase the chance of the more-heavily weighted optimal interaction. This embodiment can also be modified such that the caller is connected to the agent with the highest-weighted mix of grades to increase the chance of the more-heavily weighted mix of optimal interactions. It will be appreciated that the actions outlined in the flowchart of FIG. 7 need not occur in that exact order.

Figure 8:
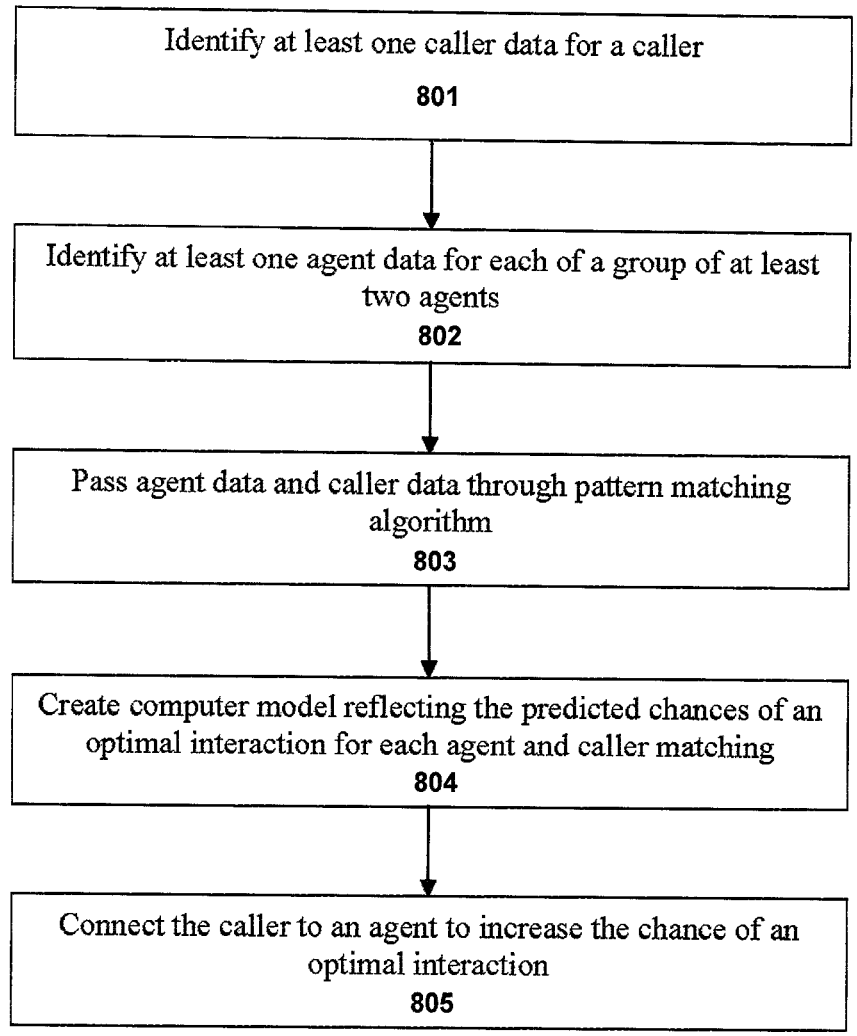
FIG. 8 is a flowchart reflecting an exemplary method for using agent data and caller data in a contact center.

FIG. 8 an exemplary method for increasing the chances of an optimal interaction by combining agent grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences. It will be appreciated that the actions outlined in the flowchart of FIG. 8 need not occur in that exact order.

Accordingly, an embodiment of a method for operating an inbound contact center comprises determining at least one caller data for a caller, determining at least one agent data for each of two agents, using the agent data and the caller data in a pattern matching algorithm, and matching the caller to one of the two agents to increase the chance of an optimal interaction. At 801, at least one caller data (such as a caller demographic or psychographic data) is determined. One way of accomplishing this is by retrieving this from available databases by using the caller's contact information as an index.

Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

At 802, at least one agent data for each of two agents is determined. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser.

Though this advanced embodiment preferably uses agent grades, demographic, psychographic, and other business-relevant data, along with caller demographic, psychographic, and other business-relevant data, other embodiments of the exemplary methods and systems can eliminate one or more types or categories of caller or agent data to minimize the computing power or storage necessary.

Once agent data and caller data have been collected, this data is passed to a computational system. The computational system then, in turn, uses this data in a pattern matching algorithm at 803 to create a computer model that matches each agent with the caller and estimates the probable outcome of each matching along a number of optimal interactions, such as the generation of a sale, the duration of contact, or the likelihood of generating an interaction that a customer finds satisfying.

The pattern matching algorithm to be used in the exemplary methods and system can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

At 804, the pattern matching algorithm is used to create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, examples can match every available agent with every available caller, or even a narrower subset of agents or callers. Likewise, the present invention can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the exemplary methods and systems to determine which agents should be connected to which callers.

At 805, connection rules are applied to define when or how to connect agents that are matched to a caller, and the caller is accordingly connected with an agent. The connection rules can be as simple as instructing the system to connect a caller according to the best match among all available agents with that particular caller. In this manner, caller hold time can be minimized. The connection rules can also be more involved, such as instructing the system to connect a caller only when a minimum threshold match exists between an available agent and a caller, to allow a defined period of time to search for a minimum matching or the best available matching at that time, or to define an order of agent suitability for a particular caller and connect the caller with a currently available agent in that order with the best chances of achieving an optimal interaction. The connection rules can also purposefully keep certain agents available while a search takes place for a potentially better match.

It is typical for a queue of callers on hold to form at a contact center. When a queue has formed it is desirable to minimize the hold time of each caller in order to increase the chances of obtaining customer satisfaction and decreasing the cost of the contact, which cost can be, not only a function of the contact duration, but also a function of the chance that a caller will drop the contact if the wait is too long. After matching the caller with agents, the connection rules can thus be configured to comprise an algorithm for queue jumping, whereby a favorable match of a caller on hold and an available agent will result in that caller "jumping" the queue by increasing the caller's connection priority so that the caller is passed to that agent first ahead of others in the chronologically listed queue. The queue jumping algorithm can be further configured to automatically implement a trade-off between the cost associated with keeping callers on hold against the benefit in terms of the chance of an optimal interaction taking place if the caller is jumped up the queue, and jumping callers up the queue to increase the overall chance of an optimal interaction taking place over time at an acceptable or minimum level of cost or chance of customer satisfaction. Callers can also be jumped up a queue if an affinity database indicates that an optimal interaction is particularly likely if the caller is matched with a specific agent that is already available.

Ideally, the connection rules should be configured to avoid situations where matches between a caller in a queue and all logged-in agents are likely to result in a small chance of a sale, but the cost of the contact is long and the chances of customer satisfaction slim because the caller is kept on hold for a long time while the system waits for the most optimal agent to become available. By identifying such a caller and jumping the caller up the queue, the contact center can avoid the situation where the overall chances of an optimal interaction (e.g., a sale) are small, but the monetary and satisfaction cost of the contact is high.

An exemplary method and system can also comprise the injection of a degree of randomness into the contact routing process such that the specific agent identified by the system as optimal or the ordering of agents produced is randomly overridden, and the caller is connected to an agent not necessarily identified as optimal for the caller. Such an injection of partial randomness may be useful in the case where the system would like certain agents to be connected to callers that they would not normally be likely to be connected to under the normal functioning in order for the agents to potentially learn from such interactions and improve their abilities in handling such callers. The degree of randomness can be set to 0.1 percent, in which case essentially no randomness is injected into the contact routing process, to 99.9 percent in which case the system is essentially not functioning at all, to 50 percent in which case half of all callers are routed randomly to agents, or any other value between 0.1 percent and 99.9 percent. Optionally, this degree of randomness can be set by the contact center, an agent, or by the contact center's clients. Such a setting may be done remotely over a data transfer and retrieval system like the internet, and can be configured to take immediate effect or may be set to take effect at a subsequent time.

Exemplary methods and systems can also comprise affinity databases, the databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

The caller affinity data can then be used to refine the matches that can be made using the exemplary methods and systems. As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue, irrespective of what the matches generated using caller data and agent demographic or psychographic data may indicate.

A more advanced affinity database includes one in which a caller's contact outcomes are tracked across the various agent data. Such an analysis might indicate, for example, that the caller is most likely to be satisfied with a contact if they are matched to an agent of similar gender, race, age, or even with a specific agent. Using this embodiment, a system or method could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if a system or method were to rely solely on commercial databases in order to match a caller and agent, it may predict that the caller would be best matched to an agent of the same gender to achieve optimal customer satisfaction. However, by including affinity database information developed from prior interactions with the caller, exemplary methods and systems might more accurately predict that the caller would be best matched to an agent of the opposite gender to achieve optimal customer satisfaction.

Another aspect of the exemplary methods and system is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in the exemplary methods and systems predicting that a specific agent performs best in interactions with callers of a similar age, and less well in interactions with a caller of a significantly older or younger age. Similarly this type of affinity database may result in the examples predicting that an agent with certain agent affinity data handles callers originating from a particular geography much better than the agent handles callers from other geographies. As another example, the system or method may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches.

Figure 9:
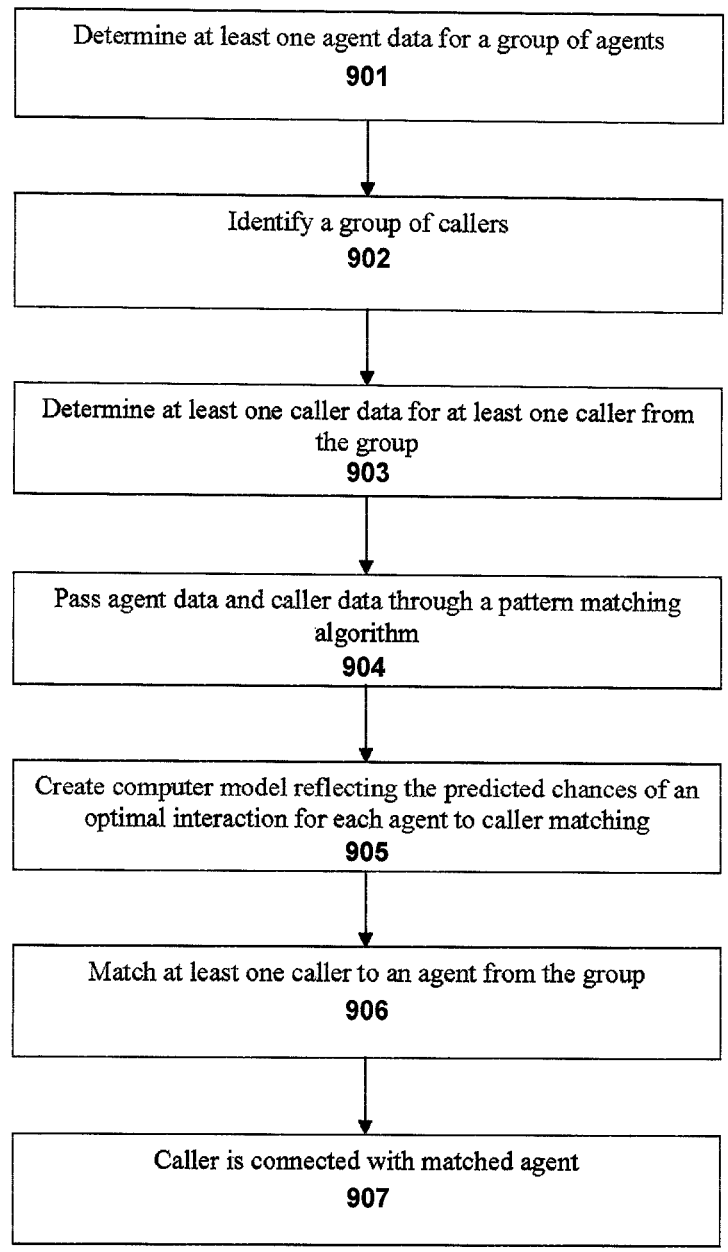
FIG. 9 is a flowchart reflecting an exemplary method for using agent data and caller data in a contact center.

FIG. 9 illustrates an exemplary method including determining at least one agent data for each of two agents, identifying a group of at least two callers, determining at least one caller data for at least one caller from the group, using the agent data and the caller data in a pattern matching algorithm; and matching at least one caller from the group to one of the two agents to increase the chance of an optimal interaction. At 901, at least one agent data is determined for a group of at least two agents. At 902, a group at least two callers is identified. This is typically accomplished through the use of lead list that is provided to the contact center by the contact center's client. At 903, at least one caller data for at least one caller from the group is identified.

Once agent data and caller data have been collected, this data is passed to a computational system. The computational system then, in turn, uses this data in a pattern matching algorithm at 904 to create a computer model that matches each agent with a caller from the group and estimates the probable outcome of each matching along a number of optimal interactions, such as the generation of a sale, the duration of contact, or the likelihood of generating an interaction that a customer finds satisfying. At 905, the pattern matching algorithm is used to create a computer model reflecting the predicted chances of an optimal interaction for each agent and caller matching.

At 906, callers are matched with an agent or a group of agents. This matching can be embodied in the form of separate lead lists generated for one or more agents, which the agents can then use to conduct their solicitation efforts. At 907, the caller is connected to the agent and the agent conducts their solicitation effort. It will be appreciated that the actions outlined in the flowchart of FIG. 9 need not occur in that exact order.

Where a dialer is used to call through a lead list, upon obtaining a live caller, the system can determine the available agents, use caller and agent data with a pattern matching algorithm to match the live caller with one or more of the available agents, and connect the caller with one of those agents. Preferably, the system will match the live caller with a group of agents, define an ordering of agent suitability for the caller within that group, match the live caller to the highest-graded agent that is available in that ordering, and connect the caller to that highest-graded agent. In matching the live caller with a group of agents, exemplary methods and systems can be used to determine a cluster of agents with similar agent data, such as similar demographic data or psychographic data, and further determine within that cluster an ordering of agent suitability. In this manner, exemplary methods and systems can increase the efficiency of the dialer and avoid having to stop the dialer until an agent with specific agent data becomes available.

The exemplary systems and methods may store data specific to each routed caller for subsequent analysis. For example, the systems and methods can store data generated in any computer model, including the chances for an optimal interaction as predicted by the computer model, such as the chances of sales, contact durations, customer satisfaction, or other parameters. Such a store may include actual data for the caller connection that was made, including the agent and caller data, whether a sale occurred, the duration of the contact, and the level of customer satisfaction. Such a store may also include actual data for the agent to caller matches that were made, as well as how, which, and when matches were considered pursuant to connection rules and prior to connection to a particular agent.

This stored information may be analyzed in several ways. One possible way is to analyze the cumulative effect of the methods and systems on an optimal interaction over different intervals of time and report that effect to the contact center or the contact center client. For example, exemplary methods and systems can report back as to the cumulative impact of the system in enhancing revenues, reducing costs, increasing customer satisfaction, over five minute, one hour, one month, one year, and other time intervals, such as since the beginning of a particular client solicitation campaign. Similarly, the exemplary methods and systems can analyze the cumulative effect of the methods and systems in enhancing revenue, reducing costs, and increasing satisfaction over a specified number of callers, for instance 10 callers, 100 callers, 1000 callers, the total number of callers processed, or other total numbers of callers.

One method for reporting the cumulative effect of employing the exemplary methods and systems comprises matching a caller with each agent logged in at the contact center, averaging the chances of an optimal interaction over each agent, determining which agent was connected to the caller, dividing the chance of an optimal interaction for the connected agent by the average chance, and generating a report of the result. In this manner, the effect of the methods and systems can be reported as the predicted increase associated with routing a caller to a specific agent as opposed to randomly routing the caller to any logged-in agent. This reporting method can also be modified to compare the optimal interaction chance of a specific agent routing against the chances of an optimal interaction as averaged over all available agents or over all logged-in agents since the commencement of a particular campaign. In fact, by dividing the average chance of an optimal interaction over all unavailable agents at a specific period of time by the average chance of an optimal interaction over all available agents at that same time, a report can be generated that indicates the overall boost created by the exemplary methods and systems to the chance of an optimal interaction at that time. Alternatively, the methods and systems can be monitored, and reports generated, by cycling the present invention on and off for a single agent or group of agents over a period of time, and measuring the actual contact results. In this manner, it can be determined what the actual, measured benefits are created by employing the methods and systems.

Embodiments of the exemplary methods and systems can include a visual computer interface and printable reports provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the weighting on an optimal interaction can also be provided to the contact center or the contact center client, such that they can, as discussed herein, monitor or change the weightings in real time or at a predetermined time in the future.

Exemplary methods and systems described herein can also comprise an intelligent routing system, the system comprising means for grading two or more agents on an optimal interaction, and means for matching a caller with at least one of the two or more graded agents to increase the chance of the optimal interaction. Means for grading an agent can comprise, as discussed herein, the use of manual or automatic surveys, the use of a computational device and database to record an agent's revenue generation performance per call, the agent's contact time per caller, or any other performance criteria that can be electronically recorded. Means for matching the caller with at least one of the two or more graded agents can comprise any computational device. The intelligent routing system can further comprise means for connecting the caller with one of the two or more agents, such as a switching system. The system can further comprise a dialer, a callerID device, and other commercially-available telephony or telecommunications equipment, as well as memory containing a database, such as a commercially available database, publicly-available database, client database, or contact center database.

In a more advanced embodiment, exemplary methods and systems can be used to create an intelligent routing system, the system comprising means for determining at least one agent data for each of two or more agents, determining at least one caller data for a caller, means for using the agent data and the caller data in a pattern matching algorithm, and means for matching the caller to one of the two or more agents to increase the chance of an optimal interaction. Means for determining agent data can comprise the use of manual or automatic surveys, which can be recorded in hardcopy or electronic form, such as through the use of computer memory containing databases for storing such information. Means for determining caller data can comprise the use of computer memory containing a database with caller data, such as a commercially-available database, client database, or contact center database. Means for determining caller data can also comprise the use of a CallerID device as well as telephony or other telecommunications equipment for receiving a caller's account number or other caller-identifying information. Means for using the agent data and the caller data in a pattern matching algorithm can comprise a computational device. Means for matching the caller to one of the two or more agents can also comprise the use of a computational device. This embodiment of the intelligent routing system can also comprise means for connecting the caller with one of the two or more agents, such as a switching or routing system. The system can also comprise means for contacting a caller, such as a dialer or telephony equipment that can be used by an agent to contact the caller.

Figure 10:
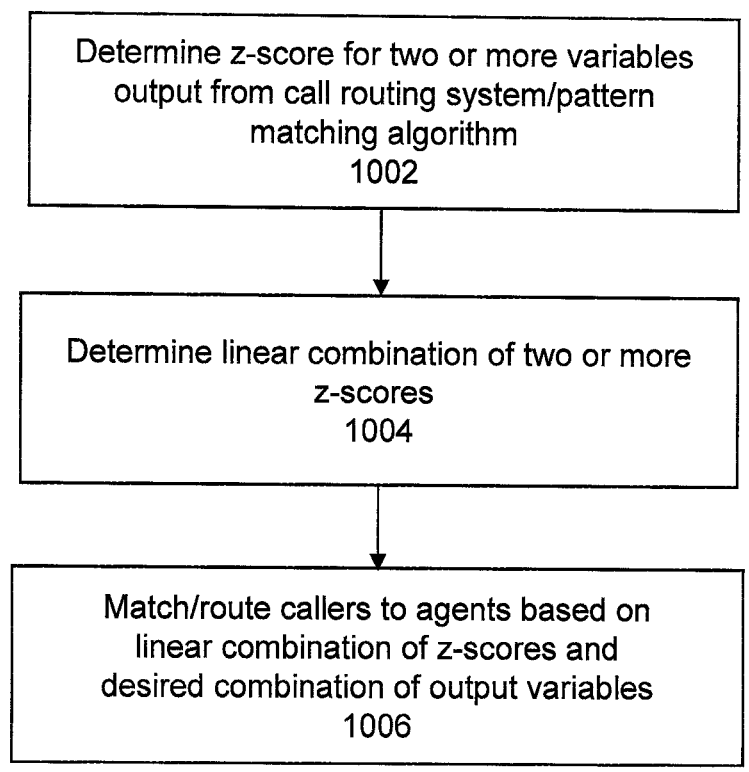
FIG. 10 is a flowchart reflecting an example for optimizing a combination or mix of multiple output variables of a pattern matching algorithm and computer model.

FIG. 10 illustrates an exemplary method for combining multiple output variables of a performance matching algorithm into a single metric for use in controlling and managing the routing system. The exemplary method includes determining a Z-score (e.g., a dimensionless standard score) for each of two or more variable outputs of the pattern matching algorithm at 1002. The Z-score, or standard score, can be computed as follows:

$$z = (x - \mu)/\sigma$$

where x is the raw output of the pattern matching algorithm for a particular output variable, $\mu$ is the mean of the output variable, and $\sigma$ is the standard deviation of the output variable. A Z-score may be computed for any number of output variables of the call routing system (e.g., of the pattern matching algorithm used). Output variables may include or be associated with, for example, revenue generation, cost, customer satisfaction, and the like.

The Z-scores are used at 1004 to determine a linear combination of two or more of the output variables, where the linear combination may be selected based on a desired mix or weighting of the output variables. For instance, a call center may determine customer satisfaction is the most important variable and weight revenue generation and cost less than customer satisfaction (e.g., assigning weighting fractions that add up to 1). The linear combination of the determined Z-scores may then be computed to provide a single score based on the multiple output variables and weighting factors. For instance, a call routing center may combine the Z-scores for a desired output of the system (e.g., deciding that one variable is to be weighted more heavily than another variable). The linear combination may then be used by the routing system for routing or matching callers to agents via the pattern matching algorithm at 1006. For example, the callers and agents may be matched in an attempt to estimate or maximize the value or score of the determined linear combination of Z-scores.

Figure 11:
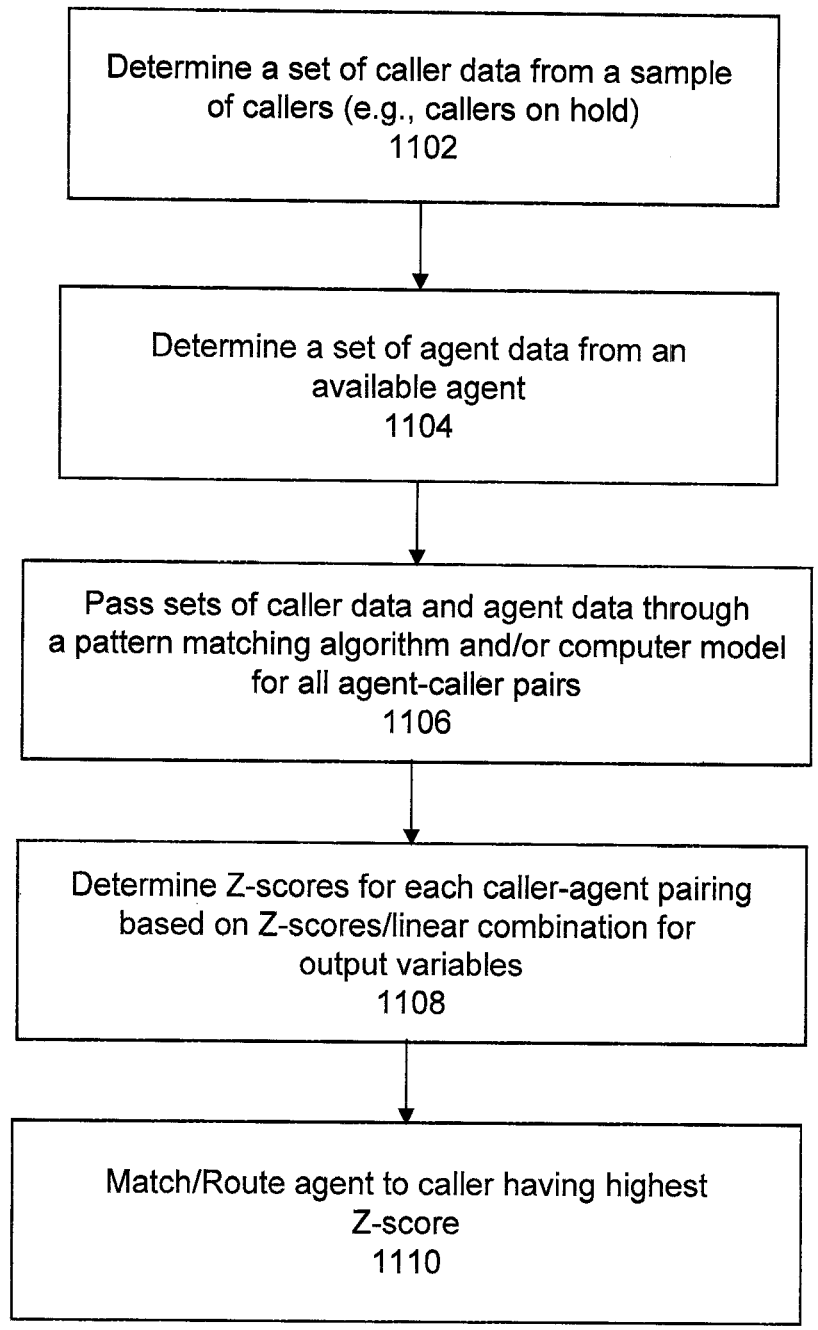
FIG. 11 illustrates a typical computing system that may be employed to implement some or all processing functionality in certain embodiments of the invention.

FIG. 11 illustrates a particular exemplary method for optimizing a combination or mix of multiple output variables of a pattern matching algorithm and/or computer model for the particular instance where multiple callers are on hold in the shadow queue and one agent becomes free to accept a caller. The method includes determining a set of caller data from a sample of callers at 1102. For example, the caller data may include caller data for all or some of the callers on hold, waiting for an agent, with the call center. The method further includes determining a set of agent data from an agent that becomes available to accept a caller at 1104, which may merely be accessed from known agent data.

The method further includes, for each possible agent-caller pair, passing the associated agent and caller data through a pattern matching algorithm/computer model at 1106. A Z-score may be determined for each agent-caller pair at 1108, which are based on predetermined Z-scores and linear combination for desired output variables of the pattern matching algorithm/computer model. The highest scoring agent-caller pairing may then be connected, e.g., the best matching caller based on the Z-scores is routed.

A more detailed, but exemplary, pattern matching algorithm and method for combining multiple variable outputs thereof includes a neural network algorithm or a genetic algorithm. As described, a pattern matching algorithm such as a neural network algorithm that can be trained or refined by comparing actual results against caller and agent data (e.g., comparing input and output data) can learn, or improve its learning of, how matching callers and agents changes the chance of an optimal interaction. The following includes an exemplary neural network pattern matching algorithm, followed by exemplary methods for scaling the output scores and combining the output scores into a composite score for determining caller-agent pairings for a desired outcome.

Initially, various terms of the exemplary pattern matching algorithm are defined to illustrate the operation. Let $A = \{a_i\}$ ($i = 1, \ldots, N$) be the set of currently logged in agents in a queue which are available for matching to an incoming caller. Note, these agents may be in one physical call center or be distributed across several call centers and controlled by several PBX's. Further, the set of callers can be denoted as:

$$C = \{c_j\} \quad (1)$$

Each agent and caller has associated agent data and caller data, e.g., demographic, psychographic information, etc. (in some cases caller data may not be available, e.g., when the caller's telephone number is either not available or cannot be found in an accessible database). Caller data and agent data can be denoted respectively as:

$$I_{i,k}^A (i=1, \ldots, N)(k=1, \ldots, P)$$

$$I_{i,k}^C (i=1, \ldots, M)(k=1, \ldots, Q) \quad (2)$$

where there are P variables describing, for example, demographic and psychographic characteristics of the agents and Q variables describing these characteristics of clients, where P and Q are not necessarily equal.

There are also output variables, which describe certain characteristics of the call center's performance, which it is desired to optimize. The three most commonly used are Revenue, denoted R, cost, which usually is calculated as call handle time, denoted here T, and Satisfaction, denoted S. In this illustrative example only these three exemplary output variables are considered, but it should be understood that more variables could be added or different variables substituted for revenue, cost, and satisfaction. For instance, other variables might include first call resolution, cancellation (e.g., later cancellation of a sale due to buyer's remorse), and the like.

An exemplary pattern matching algorithm or computer model based on a pattern matching algorithm may further include "levers", in this example three levers, for adjusting the degree to which each of the three output variables is optimized in the pattern matching algorithm when making agent-caller matches. These levers may be denoted as:

$$L_R, L_C \& L_S (0 \leq L_R, L_C, L_S \leq 1) \quad (3)$$

where the three values are subject to the constraint:

$$L_R + L_C + L_S = 1 \quad (4)$$

In this particular example, for each output variable of the pattern matching algorithm, a resilient back-propagation (RPROP) neural network has been trained. It will be understood that a RPROP neural network is a learning heuristic for use in neural network architectures for providing an update mechanism based on past outcomes to improve the output of the algorithm over time. The resulting neural network evaluation functions, one each for Revenue, Cost, and Satisfaction, can be as follows:

$$f_R: \mathbb{R}^{P+Q} \to \mathbb{R}$$

$$f_C: \mathbb{R}^{P+Q} \to \mathbb{R}$$

$$f_S: \mathbb{R}^{P+Q} \to \mathbb{R} \quad . \tag{5}$$

Each of the evaluation functions takes a vector comprising the caller data and agent data (e.g., demographic, psychographic information, etc.) for one agent and one caller and maps it to a single real number, for example:

$$f_R(I_{i,1}^A, \ldots, I_{i,P}^A, I_{j,1}^C, \ldots, I_{j,Q}^C) = x \tag{6}$$

where the revenue neural network function is mapping the characteristics of the i'th agent and j'th caller to the single real number x.

The above described neural network pattern matching algorithms may then be used by an exemplary system to determine an optimal agent-caller pair from available agents and incoming callers. In one example, there are three types of conditions under which agent-caller pair decisions are made. They include:
  i. Many agents are available and a caller calls in (Inbound) or a call is to be made to the next caller in lead list (Outbound).
  ii. Inbound calls are held in queue and one agent is available.
  iii. Callers are in queue and more than one agent is available.

A queue in a call center typically will operate in condition i or ii. The following examples are largely independent of the above described conditions, however, the most general case iii will be assumed. For instance, suppose at some instant that three agents are available:

$$A^* = \{a_i^*\}(i=1,2,3) \tag{7}$$

where the free agents are a subset of $c_1$, $c_2$ the logged in agent pool: $A^* \subset A$. Further, suppose that two callers are queued. This simple example provides that there are six (3×2=6) possible agent-caller pairings:

$$a_1^* \leftrightarrow c_1$$

$$a_1^* \leftrightarrow c_2$$

$$a_2^* \leftrightarrow c_1$$

$$a_2^* \leftrightarrow c_2$$

$$a_3^* \leftrightarrow c_1$$

$$a_3^* \leftrightarrow c_2 \tag{8}$$

The exemplary pattern matching algorithm operates on these six possible pairings to determine the optimal matching output of the six possibilities given the three lever settings $L_R$, $L_C$ & $L_S$, which may be set by the contact routing center for a desired output performance.

In one example, the first step is to evaluate the six possible pairings through the revenue, cost, and satisfaction neural network algorithms. The system looks up the agent data and caller data (e.g., agents' and clients' demographic and psychographic data) to form six vectors of length P+Q and applies the neural network function to each to generate six real numbers. Taking revenue as the example, the system computes:

$$f_R(I_{a_1}^{A*}{}_{,1}, \ldots, I_{a_1}^{A*}{}_{,P}, I_{c_1}^C{}_{,1}, \ldots, I_{c_1}^C{}_{,Q}) = r_{1,1}$$

$$f_R(I_{a_1}^{A*}{}_{,1}, \ldots, I_{a_1}^{A*}{}_{,P}, I_{c_2}^C{}_{,1}, \ldots, I_{c_2}^C{}_{,Q}) = r_{1,2}$$

$$f_R(I_{a_2}^{A*}{}_{,1}, \ldots, I_{a_2}^{A*}{}_{,P}, I_{c_1}^C{}_{,1}, \ldots, I_{c_1}^C{}_{,Q}) = r_{2,1}$$

$$f_R(I_{a_2}^{A*}{}_{,1}, \ldots, I_{a_2}^{A*}{}_{,P}, I_{c_2}^C{}_{,1}, \ldots, I_{c_2}^C{}_{,Q}) = r_{2,2}$$

$$f_R(I_{a_3}^{A*}{}_{,1}, \ldots, I_{a_3}^{A*}{}_{,P}, I_{c_1}^C{}_{,1}, \ldots, I_{c_1}^C{}_{,Q}) = r_{3,1}$$

$$f_R(I_{a_3}^{A*}{}_{,1}, \ldots, I_{a_3}^{A*}{}_{,P}, I_{c_2}^C{}_{,1}, \ldots, I_{c_2}^C{}_{,Q}) = r_{3,2} \tag{9}$$

where $r_{i,j}$ denotes the revenue neural network's output for the pairing of the i'th agent with the j'th caller (note, the notation here is such that $I_{a_i}^{A*}{}_{,1}$ refers to the demographic and psychographic information for agent $a_i^*$). In the same manner sets of six numbers can be calculated, call them $c_{i,j}$ and $s_{i,j}$ being the outputs of the cost and satisfaction neural network functions respectively for the six agent-caller pairings.

The outputs of the neural networks are on a somewhat arbitrary scale, so to compare them with each other they can be rescaled to a common metric. To this end a large number of random pairings between the logged in agents (A) and callers is formed (e.g., using callers and agents beyond the six described above). For example, call center data for the particular queue under consideration from the previous day can be used to form a sample of hundreds, thousands, or more and random matches between agents and callers. For each neural network (e.g., for revenue, cost, and satisfaction) these random pairings are evaluated and a mean and standard deviation of the resulting distributions of neural network outputs may be calculated. For instance, computing the six quantities $\mu_R$, $\sigma_R$, $\mu_C$, $\sigma_C$, $\mu_S$, $\sigma_S$, where $\mu_R$ and $\sigma_R$ are the mean and standard deviation of the revenue neural network output's distribution and similarly for cost and satisfaction.

Using the mean and standard deviations, a Z-score for each of revenue, cost, and satisfaction may be computed for the six agent-caller pairings:

$$Z_{i,j}^R = \frac{r_{1,2} - \mu_R}{\sigma_R} \quad (i=1,2,3 \quad j=1,2) \tag{10}$$

$$Z_{i,j}^C = \frac{c_{1,2} - \mu_C}{\sigma_C} \quad (i=1,2,3 \quad j=1,2)$$

$$Z_{i,j}^S = \frac{s_{1,2} - \mu_S}{\sigma_S} \quad (i=1,2,3 \quad j=1,2)$$

A call center may wish to optimize a combination of the output variables, as expressed by the lever settings, to determine agent-caller pairs. The determined Z-scores may be combined into a composite Z-score and used by the pattern matching algorithm for choosing an optimal agent-caller pair. In one example, a linear combination of the neural network outputs is formed to result in one overall Z for each agent to caller pairing as follows:

$$Z_{1,1} = L_R \times Z_{1,1}^R + L_C \times Z_{1,1}^C + L_S \times Z_{1,1}^S$$

$$Z_{1,2} = L_R \times Z_{1,2}^R + L_C \times Z_{1,2}^C + L_S \times Z_{1,2}^S$$

$$Z_{2,1} = L_R \times Z_{2,1}^R + L_C \times Z_{2,1}^C + L_S \times Z_{2,1}^S$$

$$Z_{2,2} = L_R \times Z_{2,2}^R + L_C \times Z_{2,2}^C + L_S \times Z_{2,2}^S$$

$$Z_{3,1} = L_R \times Z_{3,1}^R + L_C \times Z_{3,1}^C + L_S \times Z_{3,1}^S$$

$$Z_{3,2} = L_R \times Z_{3,2}^R + L_C \times Z_{3,2}^C + L_S \times Z_{3,2}^S \tag{11}$$

From this the system and method can find the i and j for which:

$$Z_{i,j} = \text{Max}(\{Z_{i,j}\}) \quad (12)$$

and match or route agent i with caller j. In this example, with two available agents and three queued callers, the system and method may then match and route the two available agents to two of the three queued callers, choosing the two agent-caller pairs with the highest summed Z-scores.

In one example, instead of choosing the agent-caller pairing with the highest combined Z-score in Equation 11, the method checks whether the highest Z in Equation 11 exceeds a preset threshold Z-score and only assign the caller to the agent when it does. If the threshold is not exceeded by the Z-score's of any of the available agent-caller pairings, the system does not assign a call and waits until more agents and/or callers become available and a pairing does exceed the threshold.

It should be noted, and recognized, that in practice the three outcome variables discussed (i.e., revenue, cost, and satisfaction) are typically not independent. For instance, in many call center situations revenue and cost, e.g., as measured by handle time, are anticorrelated since agents who spend longest on calls tend to have higher sales rates. Therefore, in one example, the lever settings described may be determined from a model taking this into consideration, for example, a regression based model from past data, set-up to maximize a combination of the output variables accounting for their interactions.

Additionally, in some examples, the pattern matching algorithms and Z-scores may be influenced by the length of time a caller has been on hold, e.g., taking into account a pain threshold of the caller. For instance, the probability of increased revenue, customer satisfaction, and so on may vary based on the wait time a caller is held before routing to an agent. For example, if a caller is held too long based on a threshold or pain function for caller wait time, the probability of a predicted outcome may change (e.g., after one minute on hold the probability of a sale for the particular caller may drop tremendously). As such, the system may route the caller to an otherwise sub-optimum agent match based on the linear combination of Z-scores and output variables. For example, the desired output may be to maximize revenue, however, after a pain threshold is reached for a caller, the system may route the caller in a fashion more heavily weighting customer satisfaction.

In some instances, caller data may be missing or unavailable. For instance, demographic and psychographic data may not be known for a caller, or it may be that the PBX fails to provide the telephone number for a caller. In such cases the exemplary pattern matching algorithm will not perform as well because the $I^C$ values will be unknown. In one example, the algorithm may compute $Z^R$, $Z^C$ and $Z^S$ in equation (10) without reference to the client at all. For instance, for each agent in A the system may have historical performance data, that is the values of revenue, cost, and satisfaction associated with each call that agent has handled over a historical period (e.g., a period of days or more such as 30 days). For each agent in the pool a Z-score (one each for revenue, cost and satisfaction performance) may be computed as:

$$\overline{Z}_i^R = \frac{H_i^R - \overline{H}^R}{sd(H^R)} \quad (13)$$

-continued $$\overline{Z}_i^C = \frac{H_i^C - \overline{H}^C}{sd(H^C)} \quad (i = 1, \ldots, N)$$

$$\overline{Z}_i^S = \frac{H_i^S - \overline{H}^S}{sd(H^S)}$$

where $H_i^R$ is the average historical revenue performance of agent i, and $\overline{H}^R$ and $sd(H^R)$ are the mean and standard deviation respectively of the historical performances of all N agents in the pool. In the case that a caller's data is missing, the pairings with that caller in Equation 11 have these Z values used.

Missing agent data will generally not occur as gathering agent data is typically under the control of the call routing center. In an instance where some or all agent data is missing, however, the agent can be assigned a Z=0 value, which may give the best estimate, in the absence of agent data, of fit as the average (since the mean of Z values is zero).

It is noted that the call routing center or its clients may modify the linear combination, e.g., change the mixing or weighting of desired output variables, over time. Further, the underlying Z-scores may be recomputed over time, resulting in changes to the linear combination and routing of callers. Optionally, the contact center or its clients may control the mix of output variables over the internet or some another data transfer system. As an example, a client of the contact center could access the mix of output variables currently in use over an internet browser and modify these remotely. Such a modification may be set to take immediate effect and, immediately after such a modification, subsequent caller routings occur in line with the newly establishing combination of Z-scores. An instance of such an example may arise in a case where a contact center client decides that the most important strategic priority in their business at present is the maximization of revenues. In such a case, the client would remotely alter the combination to favor the routing and matching of agents that would generate the greatest probability of a sale in a given contact. Subsequently the client may take the view that maximization of customer satisfaction is more important for their business. In this event, they can remotely alter the combination such that callers are routed to agents most likely to maximize their level of satisfaction. Alternatively, changes may be set to take effect at a subsequent time, for instance, commencing the following morning.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 12:
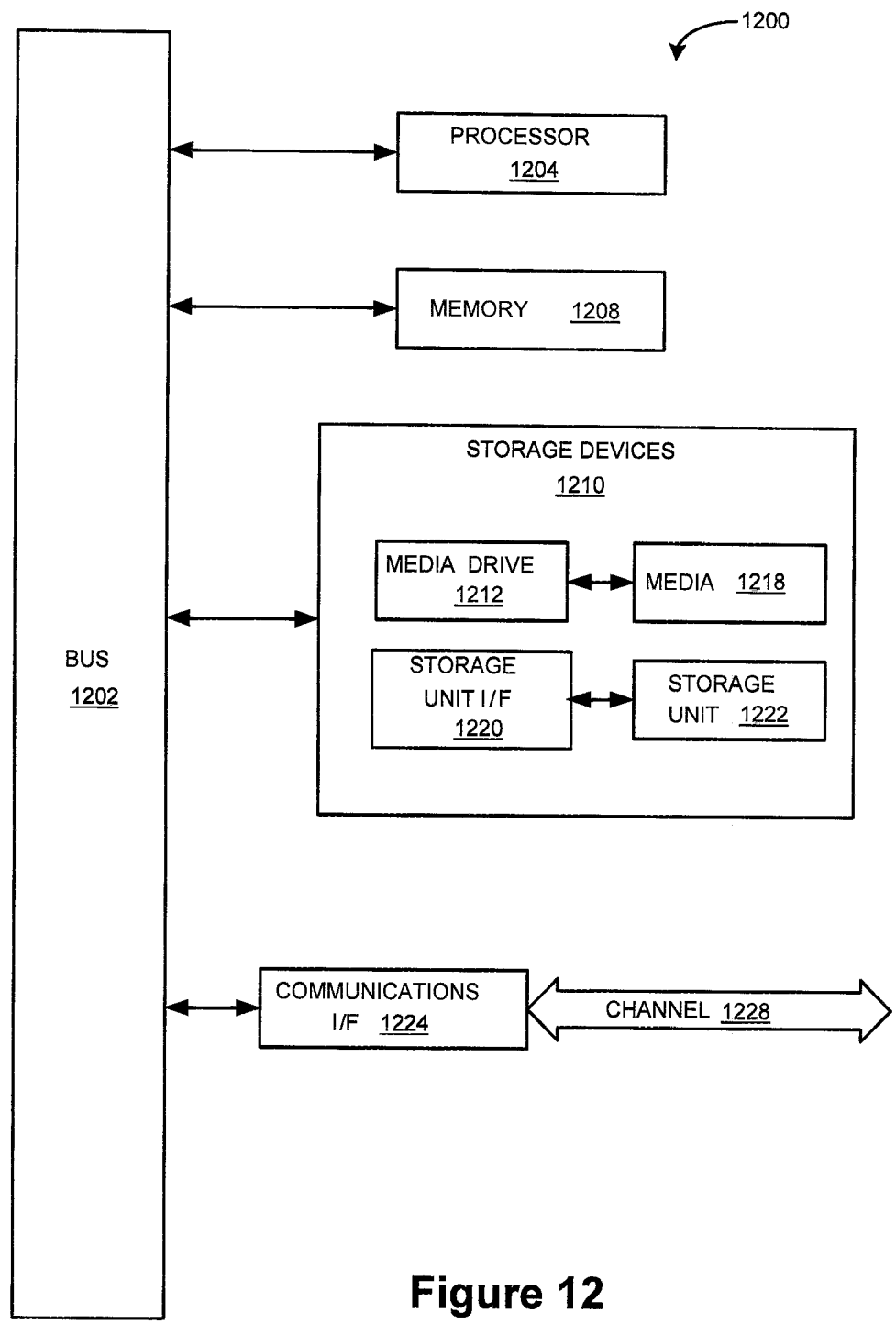
FIG. 12 illustrates a typical computing system that may be employed to implement some or all processing functionality in certain embodiments of the invention.

FIG. 12 illustrates a typical computing system 1200 that may be employed to implement processing functionality for various exemplary methods and systems described herein. Computing systems of this type may be used in clients and servers, for example. Those skilled in the relevant art will also recognize how to implement the exemplary methods and systems using other computer systems or architectures. Computing system 1200 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1200 can include one or more processors, such as a processor 1204. Processor 1204 can be implemented using a general or special purpose processing engine such as, for example, a microprocessor, microcontroller or other control logic. In this example, processor 1204 is connected to a bus 1202 or other communication medium.

Computing system 1200 can also include a main memory 1208, such as random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 may likewise include a read only memory ("ROM") or other static storage device coupled to bus 1202 for storing static information and instructions for processor 1204.

The computing system 1200 may also include information storage system 1210, which may include, for example, a media drive 1212 and a removable storage interface 1220. The media drive 1212 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1218, may include, for example, a hard disk, floppy disk, magnetic tape, optical disk, CD or DVD, or other fixed or removable medium that is read by and written to by media drive 1212. As these examples illustrate, the storage media 1218 may include a computer-readable storage medium having stored therein particular computer software or data.

In alternative embodiments, information storage system 1210 may include other similar components for allowing computer programs or other instructions or data to be loaded into computing system 1200. Such components may include, for example, a removable storage unit 1222 and an interface 1220, such as a program cartridge and cartridge interface, a removable memory (for example, a flash memory or other removable memory module) and memory slot, and other removable storage units 1222 and interfaces 1220 that allow software and data to be transferred from the removable storage unit 1218 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a USB port), a PCMCIA slot and card, etc. Software and data transferred via communications interface 1224 are in the form of signals which can be electronic, electromagnetic, optical or other signals capable of being received by communications interface 1224. These signals are provided to communications interface 1224 via a channel 1228. This channel 1228 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 1208, storage media 1218, or storage unit 1222. These and other forms of computer-readable media may be involved in storing one or more instructions for use by processor 1204, to cause the processor to perform specified operations. Such instructions, generally referred to as "computer program code" (which may be grouped in the form of computer programs or other groupings), when executed, enable the computing system 1200 to perform features or functions of examples provided herein. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1200 using, for example, removable storage drive 1214, drive 1212 or communications interface 1224. The control logic (in this example, software instructions or computer program code), when executed by the processor 1204, causes the processor 1204 to perform the functions of the examples as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made without departing from the invention in its broader aspects. The appended claims encompass such changes and modifications within the spirit and scope of the invention.

I claim:

1. A method for routing calls in a call routing center environment, the method comprising the acts performed on one or more computers of:
   determining a skill set for a caller;
   if agents are available for the determined skill set:
      determining, using a pattern matching algorithm, a predicted chance of a desired interaction between the caller and two or more available agents; and
      routing the caller an agent having a higher predicted chance of the desired interaction; and
   if no agents are available for the determined skill set:
      holding the caller in a set of callers;

when an agent becomes available, determining, using the pattern matching algorithm, a predicted chance of the desired interaction between the agent that became available and two or more callers within the set of callers; and routing a caller having a higher predicted chance of the desired interaction to the agent that became available.

2. The method of claim 1, wherein determining, using the pattern matching algorithm, the predicted chance of the desired interaction between the caller and the two or more available agents comprises comparing caller data for the caller to agent data for each of the available agents via the pattern matching algorithm.

3. The method of claim 1, wherein determining using the pattern matching algorithm, the predicted chance of the desired interaction between the agent that became available and the two or more callers within the set of callers comprises comparing agent data for the agent that became available to caller data for each of the set of callers via the pattern matching algorithm.

4. The method of claim 1, wherein determining, using the pattern matching algorithm, the predicted chance of the desired interaction between the caller and the two or more available agents comprises using a computer model reflecting the predicted chances of the desired interaction for the caller and each available agent.

5. The method of claim 1, wherein determining, using the pattern matching algorithm, the predicted chance of the desired interaction between the agent that became available and the two or more callers within the set of callers comprises using a computer model reflecting the predicted chances of the desired interaction for the agent that became available and each of the set of callers.

6. The method of claim 1, wherein the set of callers includes a plurality of callers.

7. The method of claim 1, further comprising: if the caller is held for too long moving the caller to a skill set queue, which is matched with the next available agent.

8. The method of claim 1, wherein the caller is not routed from the set of callers based on a queue order.

9. A method for routing calls in a call routing center environment, the method comprising the acts performed on one or more computers of:
if agents are available:
determining, using a pattern matching algorithm, a predicted chance of a desired interaction between a caller and two or more available agents; and
causing the caller to be routed to an agent having a higher predicted chance of the desired interaction; and
if no agents are available:
holding the caller in a set of callers;
when an agent becomes available, determining, using the pattern matching algorithm, a predicted chance of the desired interaction between the agent that became available and two or more callers within the set of callers; and
causing a caller having a higher predicted change of the desired interaction to be routed to the agent that became available.

10. The method of claim 9, wherein determining, using the pattern matching algorithm, the predicted chance of the desired interaction between the caller and the two or more available agents comprises comparing caller data for the caller to agent data for each of the available agents via the pattern matching algorithm.

11. The method of claim 9, wherein determining, using the pattern matching algorithm, the predicted chance of the desired interaction between the agent that became available and the two or more callers within the set of callers comprises comparing agent data for the agent that became available to caller data for each of the set of callers via the pattern matching algorithm.

12. The method of claim 9, wherein determining, using the pattern matching algorithm, the predicted chance of the desired interaction between the caller and the two or more available agents comprises using a computer model reflecting the predicted chances of the desired interaction for the caller and each available agent.

13. The method of claim 9, wherein determining, using the pattern matching algorithm, the predicted chance of the desired interaction between the agent that became available and the two or more callers within the set of callers comprises using a computer model reflecting the predicted chances of the desired interaction for the agent that became available and each of the set of callers.

14. The method of claim 9, further comprising: if the caller is held for too long adding the caller to a queue, which operates to match the caller with the next available agent based on queue order.

15. Apparatus for routing callers to agents in a call routing center environment, the apparatus comprising one or more computers configured with:
logic for determining if agents are available for a caller;
logic for determining, if agents are available, a predicted chance of a desired interaction between the caller and two or more available agents;
logic for causing the caller to be routed, if agents are available, to the agent having a higher predicted chance of the desired interaction; and
logic for holding the caller in a set of callers, if no agents are available, and when an agent becomes available, determining a predicted chance of the desired interaction between the agent that became available and two or more callers within the set of callers and matching the agent that became available to the caller having a higher predicted chance of the desired interaction.

16. The apparatus of claim 15, further comprising logic for determining a skill set of the caller.

17. The apparatus of claim 15, wherein determining, if agents are available, the predicted chance of the desired interaction between the caller and the two or more available agents comprises comparing caller data for the caller to agent data for each of the available agents via a pattern matching algorithm.

18. The apparatus of claim 15, wherein determining the predicted chance of the desired interaction between the agent that became available and the two or more callers within the set of callers comprises comparing agent data for the agent that became available to caller data for each of the set of callers via a pattern matching algorithm.

19. The apparatus of claim 15, wherein determining, if agents are available, the predicted chance of the desired interaction between the caller and the two or more available agents comprises using a computer model reflecting the predicted chances of the desired interaction for the caller and each available agent.

20. The apparatus of claim 15, wherein determining the predicted chance of the desired interaction between the agent that became available and the two or more callers within the set of callers comprises using a computer model reflecting the predicted chances of the desired interaction for the agent that became available and each of the set of callers, and wherein matching the agent that became available to the caller having the higher predicted chance of the desired interaction comprises routing the caller having the highest predicted chance of the desired interaction to the agent that became available.

21. The apparatus of claim 15, further comprising logic operable to move the caller to a queue that is matched with the next available agent if the caller is held for a predetermined amount of time.

22. A non-transitory computer readable storage medium comprising computer readable instructions for carrying out a method comprising the acts of:
if agents are available:
determining, using a pattern matching algorithm, a predicted chance of a desired interaction between the caller and two or more available agents; and
causing the caller to be routed to an agent having a higher predicted chance of the desired interaction; and
if no agents are available:
holding the caller in a set of callers;
when an agent becomes available, determining, using the pattern matching algorithm, a predicted chance of the desired interaction between the agent that became available and two or more callers within the set of callers; and
matching the agent that became available to the caller having the highest predicted chance of the desired interaction.

23. The non-transitory computer readable storage medium of claim 22, wherein determining, using the pattern matching algorithm, the predicted chance of the desired interaction between the caller and the two or more available agents comprises comparing caller data for the caller to agent data for each of the available agents via the pattern matching algorithm.

24. The non-transitory computer readable storage medium of claim 22, wherein determining, using the pattern matching algorithm, the predicted chance of the desired interaction between the agent that became available and the two or more callers within the set of callers comprises comparing agent data for the agent that became available to caller data for each of the set of callers via the pattern matching algorithm.

25. The non-transitory computer readable storage medium of claim 22, wherein determining, using the pattern matching algorithm, the predicted chance of the desired interaction between the caller and the two or more available agents comprises using a computer model reflecting the predicted chances of the desired interaction for the caller and each available agent.

26. The non-transitory computer readable storage medium of claim 22, wherein determining, using the pattern matching algorithm, the predicted chance of the desired interaction between the agent that became available and the two or more callers within the set of callers comprises using a computer model reflecting the predicted chances of the desired interaction for the agent that became available and each of the set of callers.

* * * * *

UNITED STATES PATENT AND TRADEMARK OFFICE
CERTIFICATE OF CORRECTION

Page 1 of 1

PATENT NO. : 8,644,490 B2
APPLICATION NO. : 12/202101
DATED : February 4, 2014
INVENTOR(S) : Randall R. Stewart It is certified that error appears in the above-identified patent and that said Letters Patent is hereby corrected as shown below:

IN THE CLAIMS

Column 28, Claim 1, Line 64 should read as follows:

--1.  A method for routing calls in a call routing center environment, the method comprising the acts performed on one or more computers of:

determining a skill set for a caller;

if agents are available for the determined skill set:

determining, using a pattern matching algorithm, a predicted chance of a desired interaction between the caller and two or more available agents; and routing the caller to an agent having a higher predicted chance of the desired interaction; and if no agents are available for the determined skill set:

holding the caller in a set of callers;

when an agent becomes available, determining, using the pattern matching algorithm, a predicted chance of the desired interaction between the agent that became available and two or more callers within the set of callers; and routing a caller having a higher predicted chance of the desired interaction to the agent that became available.--

Signed and Sealed this
Twentieth Day of May, 2014

Michelle K. Lee
*Deputy Director of the United States Patent and Trademark Office*